US006331671B1

(12) United States Patent
Makita et al.

(10) Patent No.: US 6,331,671 B1
(45) Date of Patent: Dec. 18, 2001

(54) INSTALLATION STRUCTURE OF SOLAR CELL MODULE ARRAY, INSTALLATION METHOD OF SOLAR CELL MODULE, AND SUNLIGHT POWER GENERATION SYSTEM

(75) Inventors: Hidehisa Makita, Kyotanabe; Toshihiko Mimura, Nara; Masahiro Mori, Souraku-gun; Yuji Inoue, Nara; Satoru Shiomi; Ayako Komori, both of Mishima; Yoshitaka Nagao, Souraku-gun; Makoto Sasaoka, Kyotanabe; Shigenori Itoyama, Nara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,355

(22) Filed: Feb. 24, 2000

(30) Foreign Application Priority Data

Feb. 25, 1999 (JP) .................................... 11-047324
Feb. 23, 2000 (JP) .................................... 12-046107

(51) Int. Cl.[7] .................................................. H01L 31/05
(52) U.S. Cl. .................... 136/244; 136/291; 136/293; 438/73; 438/66; 438/80; 52/173.3; 60/641.8
(58) Field of Search .................... 136/244, 291, 136/293; 438/73, 66, 80; 52/173.3; 60/641.8

(56) References Cited

U.S. PATENT DOCUMENTS 5,590,495 * 1/1997 Bressler et al. ............... 52/173.3
5,684,385 * 11/1997 Guyonneau et al. ............ 136/293

FOREIGN PATENT DOCUMENTS

| 8-86066 | 4/1996 | (JP) . |
| 9-148614 | 6/1997 | (JP) . |
| 10-135499-A | * 5/1998 | (JP) . |

* cited by examiner

Primary Examiner—Alan Diamond
(74) Attorney, Agent, or Firm—Fitzpatrick, Cella, Harper & Scinto

(57) ABSTRACT

An installation structure of a solar cell module array in which a plurality of solar cell module strings are arranged on a desired installation face is provided. The plurality of solar cell module strings have a plurality of solar cell modules. There is an inter solar cell module connection cable to electrically connect the plurality of solar cell modules, as well as a positive string cable and a negative string cable. A non-contacting means is provided such that no contact occurs between the positive string cable and the negative string cable or between the inter solar cell module connection cable and the positive string cable or/and the negative string cable. This solar cell module array installation structure excels in safety. That is, in the array installation structure, the positive and negative string cables are wired in a desirable state so that no electric short occurs between these two cables, even when a fire occurs in the vicinity of the installation face.

33 Claims, 13 Drawing Sheets

F I G. 1(a)
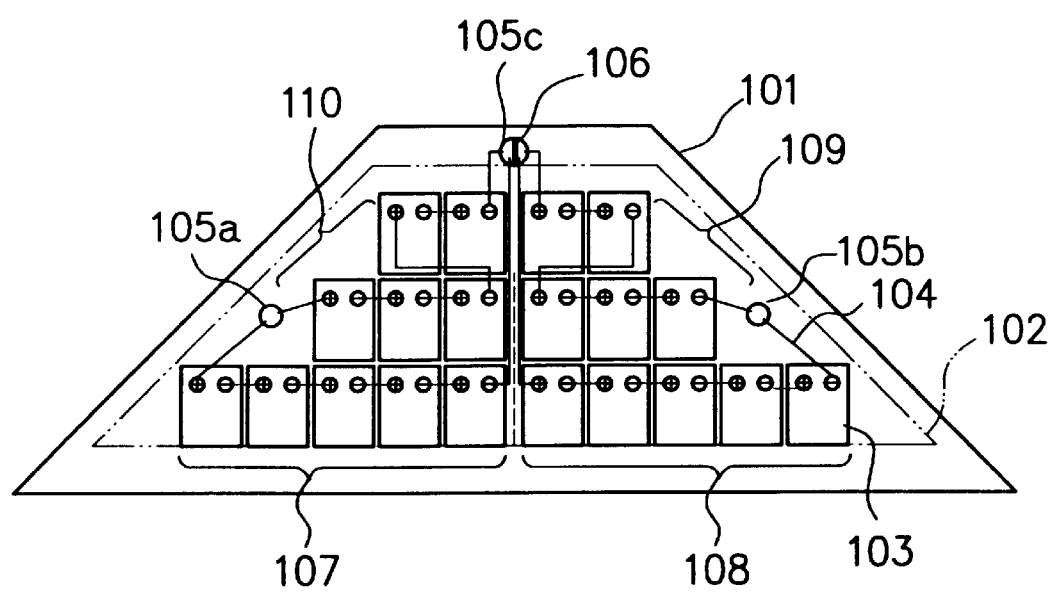

F I G. 1(b)
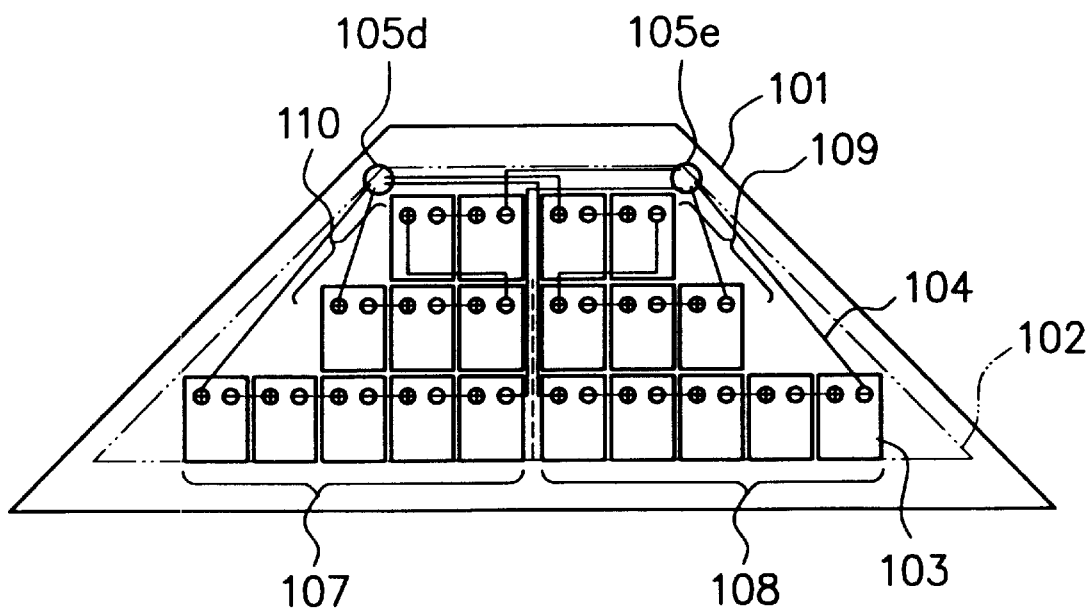

F I G. 10
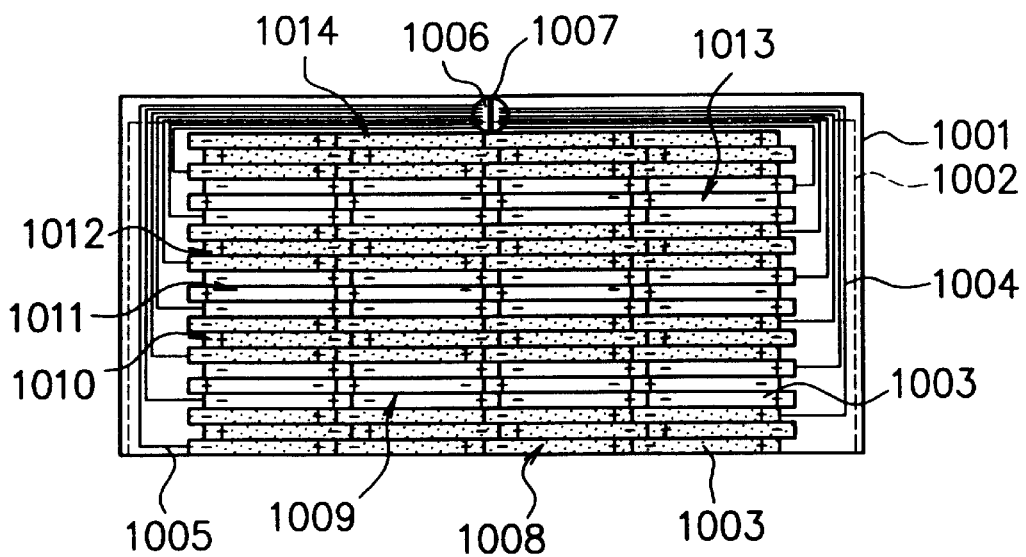

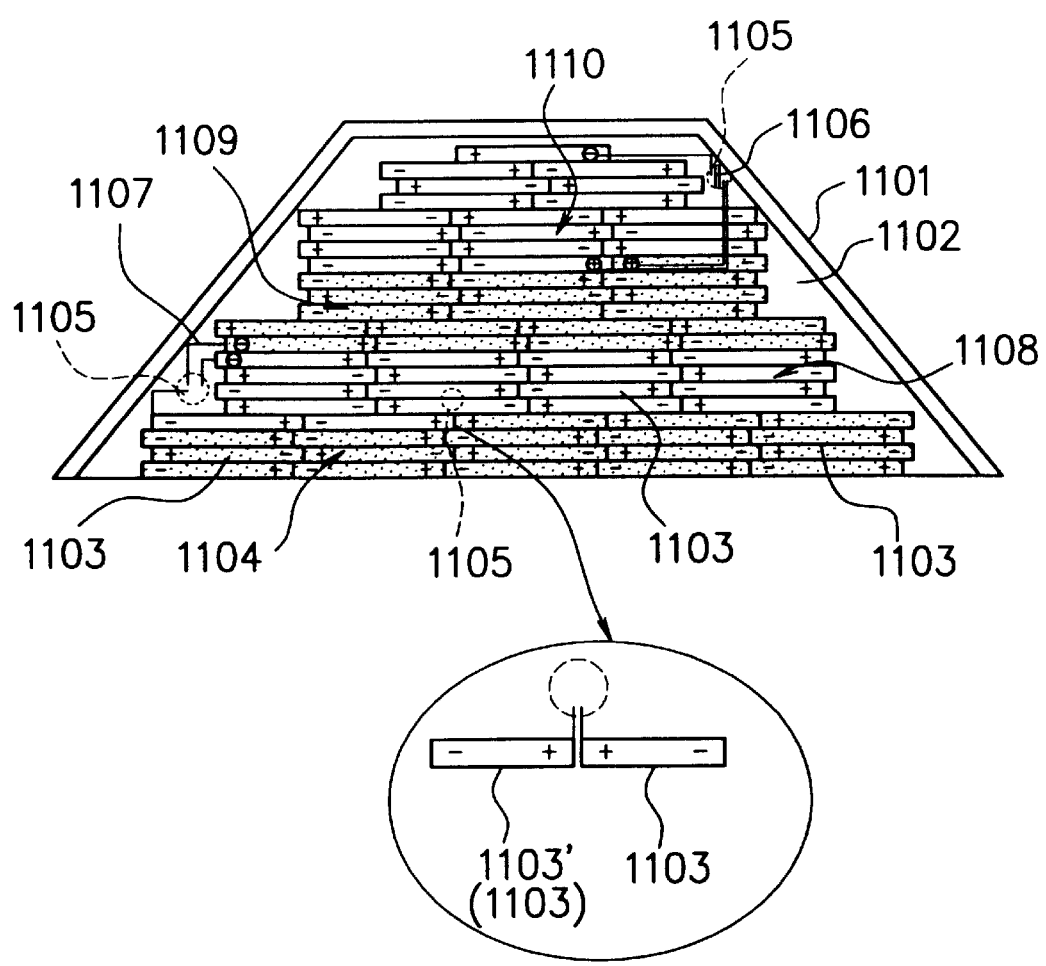

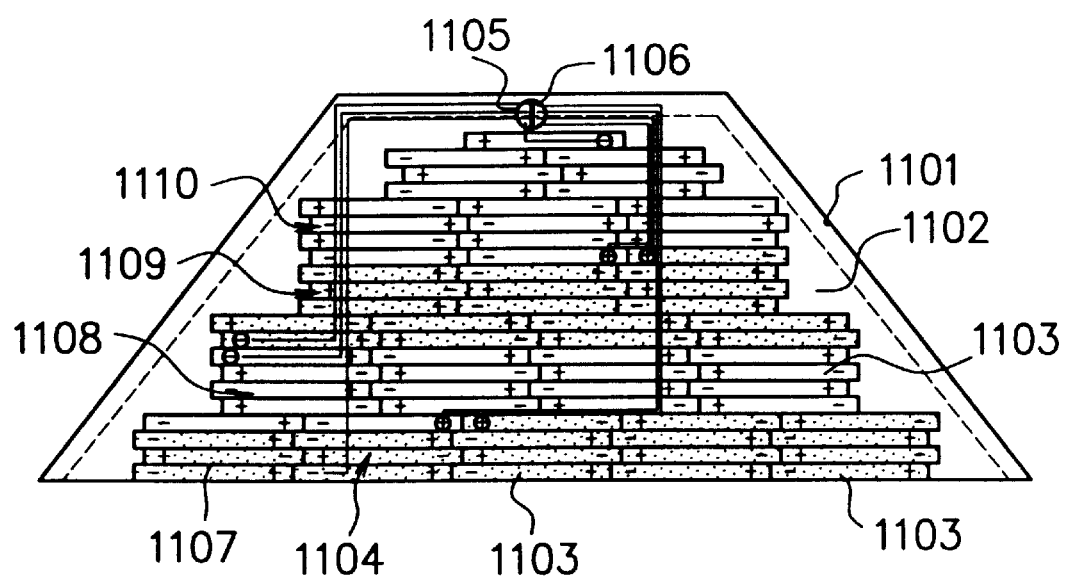
F I G. 11(b)

F I G. 12
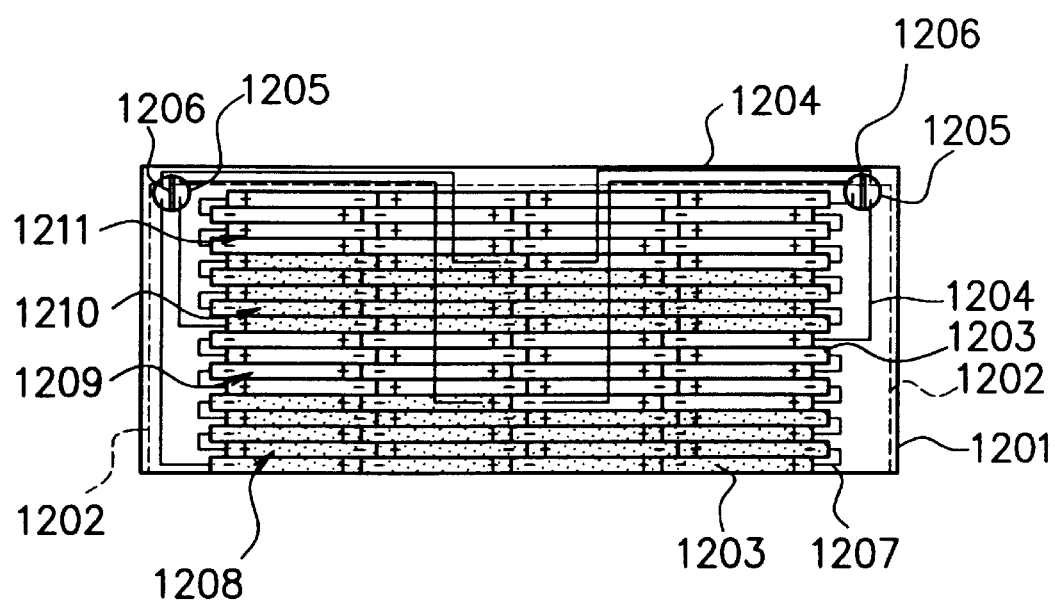

INSTALLATION STRUCTURE OF SOLAR CELL MODULE ARRAY, INSTALLATION METHOD OF SOLAR CELL MODULE, AND SUNLIGHT POWER GENERATION SYSTEM

BACKGROUND OF THE INVENTION

1. Field of the Invention

The present invention relates to an installation structure of a solar cell module array, an installation method for installing solar cell modules, a wiring method for wiring string cables of solar cell module strings, and a sunlight power generation system. The term "solar cell module" in the present invention typically indicates a module which comprises a photovoltaic element group sealed by way of resin-sealing, said photovoltaic element group comprising a plurality of photovoltaic elements electrically connected with each other. The term "solar cell module string" indicates an integral circuit comprising a plurality of solar cell modules electrically connected with each other in series connection. The term "solar cell module array" indicates an array in which a plurality of solar cell module strings are arranged while being electrically connected with each other in parallel connection.

2. Related Background Art

In recent years, societal consciousness of environmental and energy problems has been increasing all over the world. Particularly, heating of the earth because of the so-called greenhouse effect due to an increase of atmospheric $CO_2$ has been predicted to cause a serious problem. In view of this, there is an increased societal demand for early realization of a power generation system capable of providing clean energy without causing $CO_2$ buildup as in the case of thermal power generation.

As such a power generation system, public attention has been focused on a sunlight power generation system (that is, a solar cell power generation system) for the reason that it is a clean power generation system which generates electric power using sunlight, which is evenly accessible at any place in the world, as the power generation energy source, and which can attain relatively high power generation efficiency without requiring a complicated large installation, and can be expected to comply with an increase in the demand of electric power in the future without causing environmental destruction. It is expected that the use of such a sunlight power generation system will widely spread not only at private residential buildings, but also at public facilities in the near future. It is also expected that the sunlight power generation system would be used at power generation facilities in the future.

Presently, sunlight power generation systems have been used at certain private residential buildings and also at certain public facilities. It is expected that the number of private residential buildings and public facilities where a sunlight power generation system is used will gradually increase in the near future.

As such a sunlight power generation system, there have been proposed, for instance, a trestle installation type solar cell module comprising a framed solar cell module installed on a trestle provided on a roof, a building material integral type solar cell module comprising a solar cell module integrated with a building material, and a roofing material integral type solar cell module comprising a solar cell module integrated with a roofing material. Various studies have been conducted in order to improve these solar cell modules. Particularly, said building material integral type solar cell module and roofing material integral type solar cell module excel in execution work efficiency and exterior appearance and because of this, extensive studies have been conducted in order to further develop these solar cell modules.

FIGS. 2(a) and 2(b) show the constitution of an example of a typical conventional solar cell module (or a solar cell panel). In FIGS. 2(a) and 2(b), reference numeral 201 indicates a surface side covering member, reference numeral 202 an inside filler, reference numeral 203 a photovoltaic element, reference numeral 204 a back side covering member, and reference numeral 205 a frame. Reference numeral 206 indicates a terminal box for outputting a power which is provided at a rear face of the back protective member 204. Reference numeral 207 indicates a connection cable which is extended from the terminal box 206. The front side protective member 201 comprises a tempered glass plate having a thickness of about 3 mm. The back side covering member 204 comprises a resin film having weatherability such as a TEDLAR [trademark name, comprising PVF (polyvinyl fluoride)] film. The inside filler 202 is interposed between the front side protective member 201 and the back side covering member 204, where the photovoltaic element 203 is sealed by the inside filler 202. As the inside filler 202, EVA resin (ethylene-vinyl acetate copolymer) excelling in weatherability is used in many cases.

In the case where such a solar cell module is installed on a roof of a building, such problems as will be described below are liable to occur.

Japanese Unexamined Patent Publication No. 86066/1996 discloses that when a fire occurs near the building, the fire spreads to the building, and the solar cell module situated on the roof thereof is exposed to a flame or heat radiated from the spreading fire; there is a fear that the glass plate of the solar cell module will break due to the flame or heat, where the EVA as the inside filler is heat-fused or burned to flow to the outside.

Besides, Japanese Unexamined Patent Publication No. 148614/1997 discloses that when a fire occurs near the building and the fire spreads to the building, there is a fear that the glass plate as the front side protective member of the solar cell module will break due to heat radiated from or flames from the spreading fire, where the broken glass plate is scattered or the EVA as the inside filler is heat-fused to flow to the outside to cause firing at the underlayment of the roof.

Thus, for such a solar cell module having the configuration shown in FIGS. 2(a) and 2(b), it is understood that there are problems such that when a fire occurs near the building whose roof having the solar cell module installed thereon, the glass plate as the surface side protective member of the solar cell module is heated by the flame of or the heat radiated from the spreading fire to break and the EVA as the inside filler is heat-fused or burned to flow to the outside.

Separately, in the case where the solar cell module is used as a power generation source by installing it on the roof of a building, it takes such a manner as will be described in the following. That is, there are provided a number of given solar cell modules, a predetermined number of these solar cell modules are electrically connected with each other in series connection to obtain a plurality of solar cell module strings, and these solar cell module strings are electrically connected with each other by means of string cables to establish a solar cell array on the roof.

As a result of experimental studies by the present inventors of this solar cell array, there was obtained a finding that there is an occasion such that when a fire occurs in the vicinity of the solar cell array, the coating of some of the string cables is broken by heat radiated from the fire to cause leakage or the coatings of the string cables are melted by said heat, whereby the cables are mutally electrically contacted and, as a result, they are shorted.

In the past, substantially no consideration has been made of this situation which will occur at the string cables provided at the time when the solar cell modules are installed on the roof of the building.

Thus, in the prior art, such cases as will be described below are found upon wiring the string cables into the building.

(1) A case wherein regardless of the positive and negative polarities, the string cables are gathered and they are drawn into the building through an entrapment hole provided at the roof.

(2) A case wherein until the string cables are drawn into the building, the string cables of positive polarity and those of negative polarity are crossed and contacted with each other.

In the case where the wiring of the string cables is performed as described in the above case (1) or (2), when some of them have an exposed portion, there is an occasion for these string cables to contact each other. In this case, there is a fear that electrical short will occur among them.

When the string cables having such an exposed portion contact each other, since they are electrically connected to an inverter provided with a DC circuit earth-fault detector having a function of detecting the occurrence of such an electrical short to a certain extent, it is considered that occurrence of a secondary calamity or the like could be prevented beforehand.

However, there is an increased demand for not only further improving the safety but also providing a more secure safety measure.

SUMMARY OF THE INVENTION

The present invention is aimed at solving the foregoing problems upon installing a solar cell module on a desired installation place such as a roof of a building in the prior art.

Another object of the present invention is to provide an installation structure of a solar cell module array, an installation method for installing solar cell modules, and a wiring method for wiring string cables of solar cell module strings which are free of the foregoing problems in the prior art, and also a desirable sunlight power generation system.

A further object of the present invention is to provide an installation structure of a solar cell module array, an installation method for installing solar cell modules, a wiring method for wiring string cables of solar cell module strings, and a sunlight power generation system in which an ordinary execution worker can efficiently perform desirable wiring so that no defect occurs in the completed wiring.

A further object of the present invention is to provide an installation structure of a solar cell module array in which a plurality of solar cell module strings are arranged on a desired installation place, said plurality of solar cell module strings having a plurality of solar cell modules, an inter solar cell module connection cable to electrically connect said plurality of solar cell modules, a positive string cable and a negative string cable, characterized in that a non-contacting means is provided such that no contact occurs between said positive string cable and said negative string cable or between said inter solar cell module connection cable and said positive string cable or/and said negative string cable.

A further object of the present invention is to provide an installation method of a solar cell module array comprising arranging a plurality of solar cell module strings on a desired place, said plurality of solar cell module strings having a plurality of solar cell modules, an inter solar cell module connection cable to electrically connect said plurality of solar cell modules, a positive string cable and a negative string cable, characterized in that anon-contacting means is provided such that no contact occurs between said positive string cable and said negative string cable or between said inter solar cell module connection cable and said positive string cable or/and said negative string cable.

A further object of the present invention is to provide an installation structure of a solar cell module array in which a plurality of solar cell module strings are arranged on a desired installation place, said plurality of solar cell module strings having a plurality of solar cell modules, an inter solar cell module connection cable to electrically connect said plurality of solar cell modules, a positive string cable and a negative string cable, characterized in that said plurality of solar cell modules and each of said inter solar cell module connection cable, said positive string cable and said negative string cable are arranged such that no contact occurs between said positive string cable and said negative string cable or between said inter solar cell module connection cable and said positive string cable or/and said negative string cable.

A further object of the present invention is to provide an installation method of a solar cell module array comprising arranging a plurality of solar cell module strings on a desired installation place, said plurality of solar cell module strings having a plurality of solar cell modules, an inter solar cell module connection cable to electrically connect said plurality of solar cell modules, a positive string cable and a negative string cable, characterized in that said plurality of solar cell modules and each of said inter solar cell module connection cable, said positive string cable and said negative string cable are arranged such that no contact occurs between said positive string cable and said negative string cable or between said inter solar cell module connection cable and said positive string cable or/and said negative string cable.

A further object of the present invention is to provide a sunlight power generation system comprising any of the above-described solar cell module installation structure and an inverter.

According to the present invention, no contact occurs between the positive and negative string cables and also between these string cables and the inter solar cell module connection cable, and because of this, the respective cables are always maintained without causing electric short among the cables.

BRIEF DESCRIPTION OF THE DRAWINGS

FIGS. 1(a) and 1(b) are schematic views respectively illustrating an example of an installation structure of a solar cell module array according to the present invention.

FIG. 10 is a schematic view illustrating another embodiment of arranging and wiring solar cell modules in the present invention.

FIG. 11(a) is a schematic view illustrating a further embodiment of arranging and wiring solar cell modules in the present invention.

FIG. 11(b) is a schematic view illustrating a further embodiment of arranging and wiring solar cell modules in the present invention.

FIG. 12 is a schematic view illustrating a still further embodiment of arranging and wiring solar cell modules in the present invention.

DETAILED DESCRIPTION OF THE INVENTION AND PREFERRED EMBODIMENTS

The present invention is to solve the foregoing problems found in the prior art and to attain the above-described objects.

In the following, embodiments of the present invention will be described. It should be understood that the present invention includes modifications of these embodiments, as long as the object of the present invention can be attained.

A principal feature of the present invention is to prevent mutual contact of wiring cables in establishing a solar cell module array on an installation place (or an installation face) by (a) a contact-preventing method by way of a specific non-contact means or (b) a contact-preventing method by way of specific non-contact arrangement for the wiring cables or solar cell modules.

Description will be made of the contact-preventing method (a) by way of the non-contact means in the present invention.

In the case where a solar cell module array is established by arranging a plurality of solar cell module strings on a given installation place such as a roof of a building, electrically connecting them with each other by means of a pair of a positive string cable and a negative string cable, and drawing the positive and negative string cables into, for instance, the inside of the building through an entrapment hole, where they are electrically connected to an inverter.

Here, each of the solar cell module strings comprises a plurality of solar cell modules electrically connected with each other in series connection by means of an inter solar cell module connection cable (hereinafter referred to as "inter module connection cable"), where the inter module connection cable wired among the solar cell modules has a pair of extended opposite portions which serve as a pair of power output terminals, i.e., a positive power output terminal and a negative power output terminal of the solar cell module string. In the solar cell module array, the solar cell module strings are electrically connected with each other by connecting their positive power output terminals to the positive string cable and connecting their negative power output terminals to the negative string cable.

In the wiring of the positive and negative string cables in the establishment of the solar cell module array as above-described, there are considered the following three cases where mutual contact of the positive and negative string cables will occur.

(i) A case wherein until the positive and negative string cables are taken in the entrapment hole, they are mutually contacted.

(ii) A case wherein until the positive and negative string cables are taken in the entrapment hole, the positive string cable or/and the negative string cable are contacted with the inter module connection cable.

(iii) A case wherein the positive and negative string cables are mutually contacted in the entrapment hole.

Figure 4:
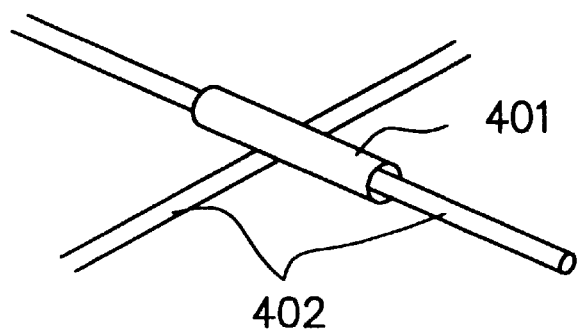
FIG. 4 is a schematic view illustrating an example of a cable contact-preventing method using an incombustible tube in the present invention.
Figure 5:
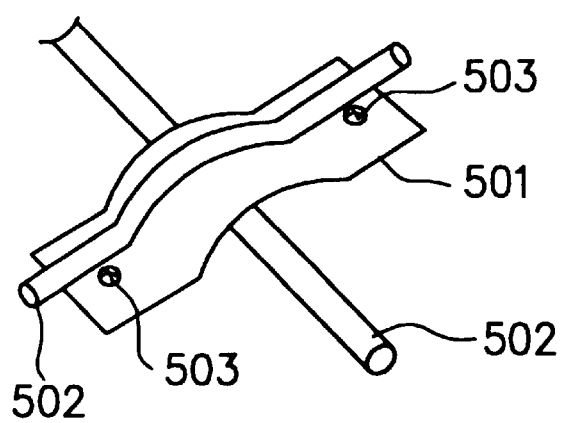
FIG. 5 is a schematic view illustrating an example of a cable contact-preventing method using an incombustible bridge in the present invention.

For instance, in the case where the above case (i) or (ii) occurs, it is desired to take such a manner as shown in FIG. 4 wherein for two cables 401 which would contact one another, one of the two cables is covered by a tube 401 made of an incombustible material or such a manner as shown in FIG. 5 wherein between two cables 502 which would contact one another, a member 501 (a bridge member) made of an incombustible material is provided [in this embodiment, the bridge member 501 is provided with fixing penetrations 503 and it is fixed to an installation face (not shown) using said fixing penetrations and by means of nails, bolts or tapping vises].

Figure 6:
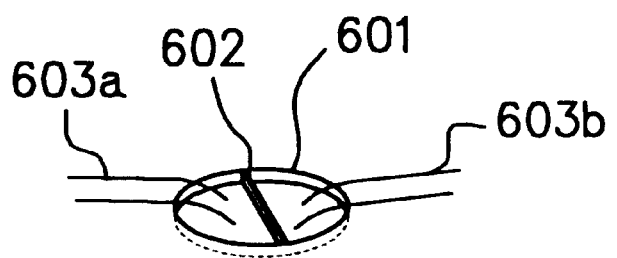
FIG. 6 is a schematic view illustrating an example of a cable contact-preventing method using an incombustible partition plate in the present invention.

In the case where the above case (iii) occurs, it is desired to take such a manner as shown in FIG. 6 wherein a partition plate 602 made of an incombustible material is arranged in an entrapment hole 601 and a positive string cable 603(a) and a negative string cable 603(b) are separately taken in the entrapment hole 601 such that each of the string cables (a) and (b) passes through one of the two spaces divided by the partition plate 602 in the entrapment hole.

Description will be made of the foregoing contact-preventing method (b) in the present invention.

To prevent mutual contact of the wiring cables in establishing a solar cell module array on an installation place (or an installation face), for instance, of a roof of a building may be performed by a method of contriving non-contact arrangement in the arrangement of the solar cell modules or that of the wiring cables. As such a method, there can be illustrated methods which will be described in the following (1) to (5).

Figure 7:
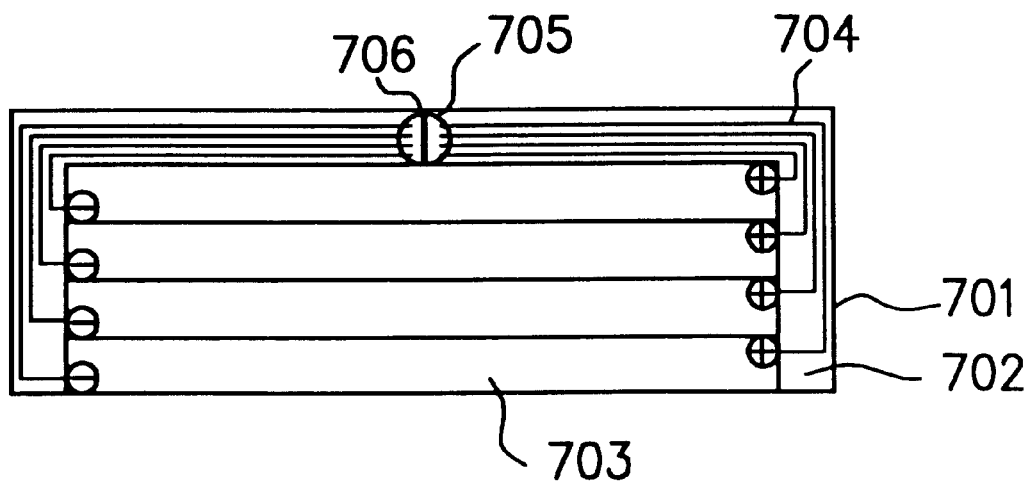
FIG. 7 is a schematic view illustrating an example of a cable contact-preventing method by completing directions of solar cell module strings.

(1) When the solar cell module strings are arranged, they are arranged so as to have a common direction with respect to their positive terminals and their negative terminals. Specifically, for instance, as shown in FIG. 7, when a plurality of solar cell module strings 703 are installed on an installation face 701, they are arranged such that their positive terminals are situated on the right side in the figure and their negative terminals are situated on the left side in the figure. Positive and negative string cables 704 of the solar cell module strings 703 are arranged in an area 702 having no solar cell module such that the positive string cables and the negative string cables are not contacted until a entrapment hole 705 provided on a ridge side of the installation face 701. In this embodiment, a partition plate 707 made of an incombustible material is provided in the entrapment hole 705 so that the entrapment hole has two spaces divided by the partition plate 707. The positive and negative string cables 704 are separately taken in the entrapment hole 705 such that the positive string cables pass through one of the two spaces of the entrapment hole and the negative string cables pass through the other space of the entrapment hole. By this, mutual contact among the cables having a different polarity is prevented.

(2) The string cables are arranged in an area where no solar cell module is present. For instance, as shown in FIG. 7, the string cables 704 are arranged in the area 702 where no solar cell module is present so that the string cables are not contacted with inter module connection cables (not shown).

(3) In the case where each of the solar cell modules constituting the solar cell module string has a pair of a positive terminal box and a negative terminal box, the string cable is arranged in an area (where no inter module connection cable is present) between the two terminal boxes, whereby the string cable is prevented from contacting the inter module connection cable.

Figure 8:
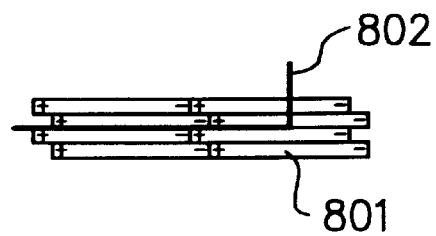
FIG. 8 is a schematic view illustrating an example of a cable contact-preventing method by providing a wiring cable between solar cell modules or between terminal boxes in the present invention.

(4) The string cable is arranged in a boundary portion between adjacent solar cell modules, whereby the string cable is prevented from contacting the inter module connection cable. Specifically, for instance, as shown in FIG. 8, a string cable 802 is arranged in a boundary portion (which is a lateral portion of the cable 802 in the figure) between adjacent solar cell modules 801 and in an inbetween portion (a portion between "+" and "−" in the figure: a longitudinal portion of the cable 802) of terminal boxes (not shown) of the solar cell modules 801 involved, whereby the string cable is prevented from being contacted with the inter module cable (not shown).

Figure 9:
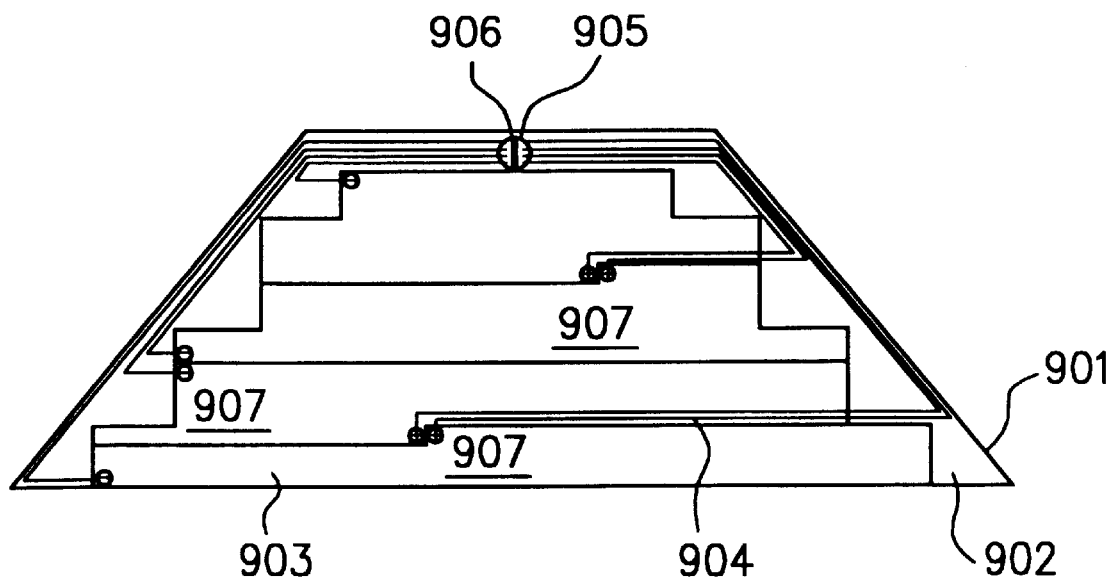
FIG. 9 is a schematic view illustrating an embodiment of arranging and wiring solar cell modules in the present invention.

(5) In the case where a plurality of solar cell module strings are arranged such that their terminals are proximate, by making their terminals to be of a common polarity, the string cables having a different polarity are prevented from contacting. Specifically, for instance, as shown in FIG. 9, in the case where a plurality of solar cell module strings are arranged on an installation face 901, string cables 904 are arranged in an area 902 where no solar cell module is present, and the string cables are taken in an entrapment hole 905 provided at the installation face 901, at each portion 907 comprising a terminal box (shown by a mark comprising "++" or "−" in the figure) where the string cables 904 involved are proximate, these string cables are made to be of a common polarity.

Separately, also in this embodiment, a partition plate 906 made of an incombustible material is provided in the entrapment hole 905 so that the entrapment hole has two spaces divided by the partition plate 906. The positive string cables and the negative string cables are separately taken in the entrapment hole 905 such that the former passes through one of the two spaces of the entrapment hole and the latter passes through the other space of the entrapment hole. By this, mutual contact among the cables having a different polarity is prevented.

Description will be made of installation structures of solar cell modules using such a non-contact arrangement method as above-described in the present invention, with reference to the drawings.

FIG. 1(*a*) is a schematic view illustrating an example of an installation structure of a solar cell module array in which a plurality of roofing material-integral type solar cell modules are arranged on a trapezoidal roof face so that the solar cell modules arranged in one arrangement row and those arranged in the other arrangement row are completed in terms of their edge lines in a direction perpendicular to a horizontal line.

In FIG. 1(*a*), reference numeral 101 indicates an installation face (a roof face) of a building (not shown), reference numeral 102 an installable area, reference numeral 103 a solar cell module, reference numeral 104 a string cable, each of reference numerals 105*a* to 105*c* an entrapment hole, and reference numeral 106 an incombustible member (an incombustible partition plate). Reference numeral 107 indicates a first solar cell module string, reference numeral 108 a second solar cell module string, reference numeral 109 a third solar cell module string, and reference numeral 110 a fourth solar cell module string. (The term "solar cell module string" will be hereinafter referred to as "string" for simplification purposes.)

As shown in FIG. 1(*a*), on the installable area 102 of the roof face 101 of the building, 10 solar cell modules 103 are arranged in a first row, 6 solar cell modules 103 are arranged in a second row, and 4 solar cell modules 103 are arranged in a third row, where these solar cell modules are wired such that five of them are electrically serialized to form one string and four strings are electrically connected in parallel connection. Particularly, each of the first to fourth strings 107 to 110 is formed by electrically serializing five of the solar cell modules 103. The first to fourth strings 107 to 110 are electrically connected with each other in parallel connection by means of string cables 104.

The roof face 101 is provided with one entrapment hole 105*c* on its ridge side for the string cables 104 extending from the strings 107 to 110 to be drawn into the inside of the building by passing them through the entrapment hole 105*c*. The roof face 101 is also provided with two entrapment holes 105*a* and 105*b* each situated at a given position of each of its left and right sides, where given string cables 104 are passed through the entrapment holes 105*a* and 105*b*, and they are connected respectively to a junction box (not shown). Particularly, the positive string cables 104 extending from the first and fourth strings 107 and 110 are passed through the entrapment hole 105*a* situated on the left side in the figure, and the negative string cables 104 extending from the second and third strings 108 and 109 are passed through the entrapment hole 105*b* situated on the right side in the figure.

In the entrapment hole 105*c* situated on the ridge side of the roof face 101, an incombustible partition plate 106 comprising an incombustible member such as a gypsum board or a steel plate coated by an incombustible material is inserted to form a left side space and a right side space (in the figure) divided by the partition plate 106. The negative string cables 104 extending from the first and fourth strings 107 and 110 are drawn into the inside of the building by passing them through the left side space of the entrapment hole 105*c*, and the positive string cables 104 extending from the second and third strings 108 and 109 are drawn into the inside of the building by passing them through the right side space of the entrapment hole 105*c*.

Separately, in the area of the roof face 101 where no solar cell module is present, a roofing material is provided.

FIG. 1(*b*) is a schematic view illustrating another example of an installation structure of a solar cell module array in which a plurality of roofing material-integral type solar cell modules are arranged on a trapezoidal roof face so that the solar cell modules arranged in one arrangement row and those arranged in the other arrangement row are completed in terms of their edge lines in a direction perpendicular to a horizontal line.

The constitution of this embodiment shown in FIG. 1(b) is the same as that of the embodiment shown in FIG. 1(a), except that the arrangement manner of the string cables is changed, and the number of the entrapment holes to be used and their positions are changed. Specifically, in this embodiment, two entrapment holes 105d and 105e are provided on the ridge side of the roof face 101, and the positive string cables and the negative string cables are drawn into the inside of the building by separately passing them respectively through one of the entrapment holes 105d and 105e. That is, in this embodiment, one string cable having a given polarity is passed through one entrapment hole and the other string cable whose polarity is different from that of the former is passed through the other entrapment hole. In this case, as the positive string cable and the negative string cable are crossed on the ridge side of the roof face, there is a fear that these string cables having a different polarity would contact one another. However, their mutual contact can be prevented by adopting the foregoing contact-preventing manner shown in FIG. 5.

In the following, description will be made of each constituent material used in the present invention.

Incombustible Material

As the incombustible material constituting the contact-preventing means including the tube 401 (see, FIG. 4), the bridge member 501 (see, FIG. 5), the partition plate 106 (see, FIG. 1), and the like, any material can be used as long as it is incombustible. Specific examples of such a material include coated metallic members, gypsum boards, tiles, cement plates, heat-resistant seals, and the like.

Solar Cell Module 103

Figure 2A:
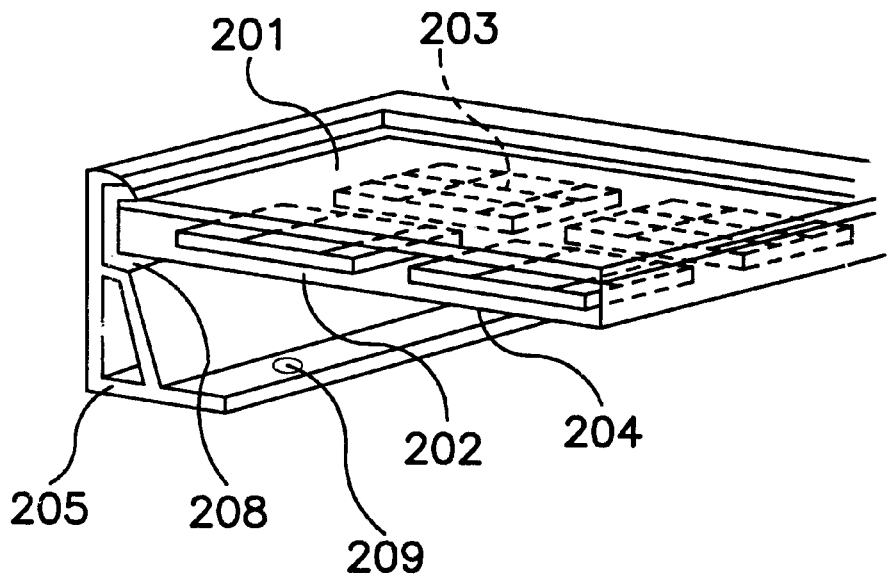
FIGS. 2(a) and 2(b) are schematic views illustrating an example of an ordinary solar cell module.
Figure 2B:
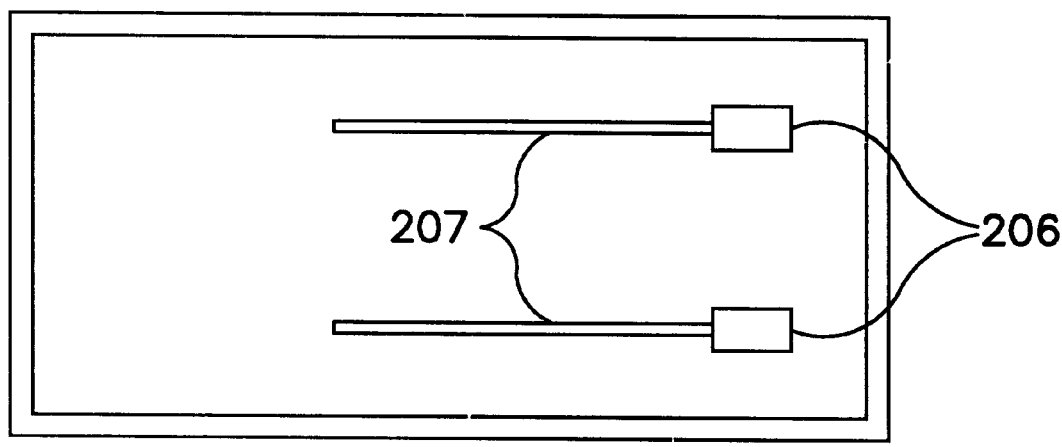
Figure 3A:
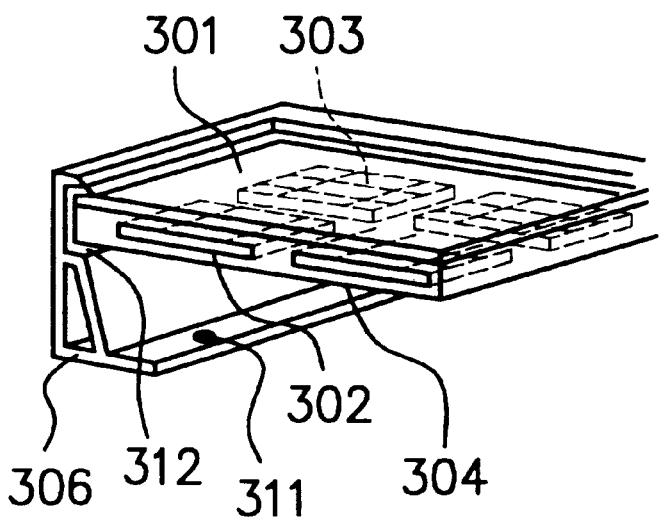
FIGS. 3(a) and 3(b) are schematic views illustrating an example of a solar cell module which is used in the present invention.
Figure 3B:
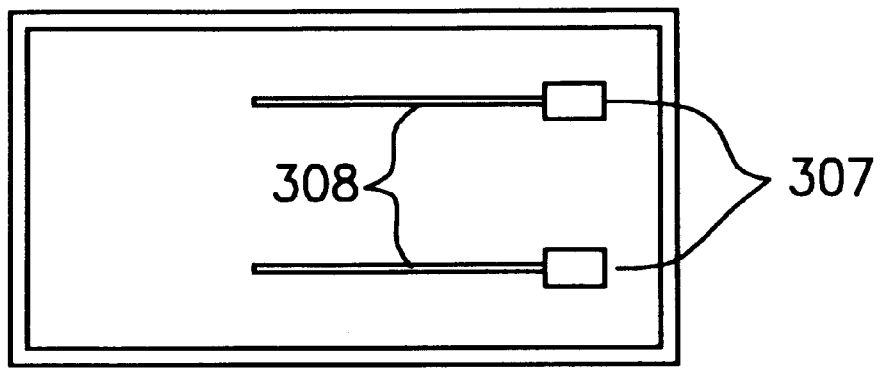
Figure 3C:
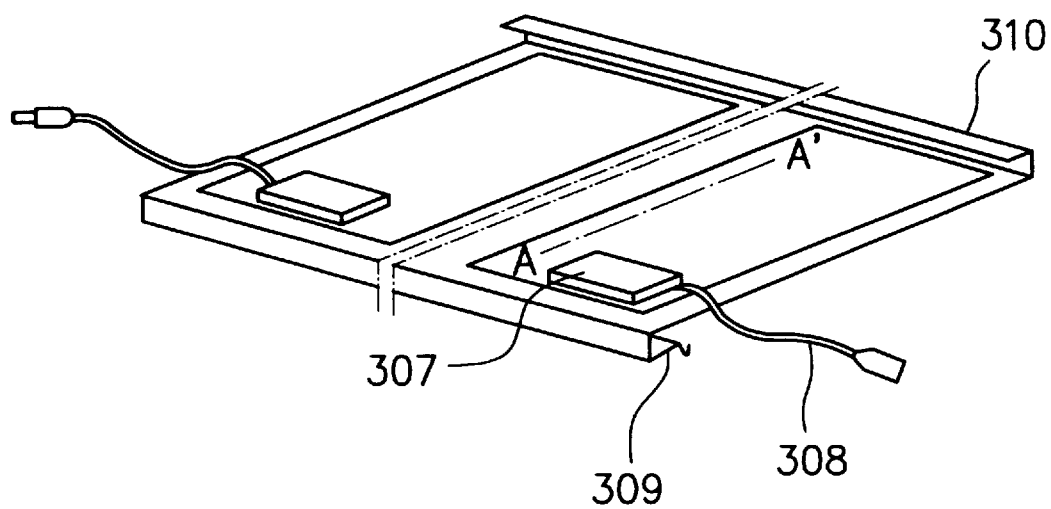
FIGS. 3(c) and 3(d) are schematic views illustrating another example of a solar cell module which is used in the present invention.
Figure 3D:
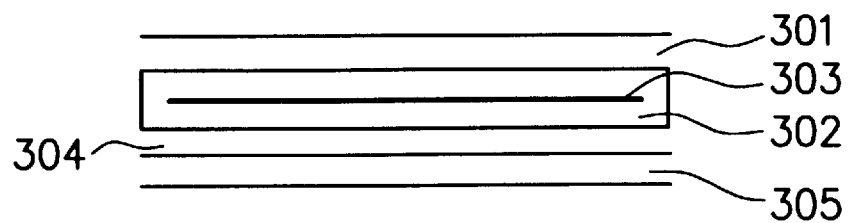

As the solar cell module 103, there can be mentioned, for example, a solar cell module having such a configuration as shown in FIGS. 3(a) and 3(b) and a solar cell module having such a configuration as shown in FIGS. 3(c) and 3(d).

Detailed description will be made of each of these solar cell modules.

FIG. 3(a) is a schematic slant view illustrating an example of a framed type solar cell module. FIG. 3(b) is a schematic view illustrating the back face of the solar cell module shown in FIG. 3(a). The framed type solar cell module comprising a solar cell module body whose peripheral portion is supported by an aluminum frame 306 having a meshing portion with a cross section in a ⊐ form. The solar cell module body comprising a photovoltaic element group 303 (comprising a plurality of photovoltaic elements electrically connected with each other) encapsulated in a filler 302 and which is sealed between a surface side covering member 301 (comprising a tempered glass) and a back side covering member 304. Reference numeral 312 indicates a sealing member comprising an insulating material which is provided at the rear face of the back side covering member 304 for the purpose of tightly sealing between the solar cell module body and the supporting means (the frame body 306) in order to prevent water invasion.

On the back face of the back side covering member 304, there are provided a pair of terminal boxes 307 having a connection cable 308, and a pair of power output terminals (not shown) of the photovoltaic element group 303 are extended to connect to the terminal boxes 307.

A fixing penetration 311 is provided at each of the lower left and right side portions of the frame 306, and the frame 306 is directly fixed to a roof bed (not shown) using the fixing penetrations 311 and by means of fixing materials such as tapping screws.

FIG. 3(c) is a schematic slant view illustrating an example of a roofing material-integral type solar cell module having a surface side covering member 301 (comprising a resin film having weatherablity) and a back face reinforcing member 305, viewed from the back side of the solar cell module. As shown, the roofing material-integral type solar cell module has opposite side end potions 390 and 310 having no photovoltaic element therein, where the side end portion 390 is downward bent by way of roll forming so as to serve as an eaves side meshing means and the side end portion 310 is upward bent by way of roll forming so as to serve as a ridge side meshing means.

As shown in FIG. 3(c), a pair of terminal boxes 307 having a connection cable 308 are provided on the back face of back side reinforcing member 305.

FIG. 3(d) is a schematic cross-sectional view, taken along the line A–A' in FIG. 3(c). In FIG. 3(d), there is shown a solar cell module body comprising a photovoltaic element group 303 (comprising a plurality of photovoltaic elements electrically connected with each other) encapsulated in a filler 302 and which is sealed between the surface side covering member 301 and a back side covering member 304. The back face reinforcing member 305 is laminated on the rear face of the back side covering member 304.

In the following, description will be made of each constituent of each of the above-described solar cell modules.

Photovoltaic Element

The photovoltaic element comprises at least a photoelectric conversion layer formed on a substrate having an electrically conductive face. The photoelectric conversion layer may be a single-crystalline silicon series photoelectric conversion layer, a polycrystalline silicon series photoelectric conversion layer, a microcrystalline silicon series photoelectric conversion layer, an amorphous silicon series photoelectric conversion layer, or a compound semiconductor series photoelectric conversion layer.

The substrate may comprise a metal substrate, a glass substrate having a surface applied with electrically conductive treatment, a resin substrate having a surface applied with electrically conductive treatment, or a substrate comprising a silicon crystal film.

Photovoltaic Element Group 303

A photovoltaic element has a limitation in terms of electric performance. Therefore, it is desired to use a plurality of photovoltaic elements by electrically connecting them with each other into an assembled body.

This assembled body corresponds to the photovoltaic element group 303 in the present invention.

The electrical connection among said plurality of photovoltaic elements may be conducted by way of series connection, parallel connection, or a combination of series connection and parallel connection. In order for the photovoltaic element group 303 to output a high power, it is desired that the photovoltaic elements involved are electrically connected with each other in series connection.

In the present invention, the photovoltaic element group 303 in the solar cell module may be replaced by one photovoltaic element.

Surface Side Covering Member 301

The surface side covering member 301 is required to have performance in order to ensure the long reliability of the solar cell module when exposed to outdoor environments over a long period of time. In this connection, the surface side covering member is required to excel in weatherability (including moisture resistance), pollution resistance, transparency, physical strength and durability. Therefore, the surface side covering member necessarily comprises a material which satisfies the above requirements.

Preferable specific examples of such a material are tempered glasses and fluorine-containing resins (fluororesins) such as polyvinyl fluoride resin, polyvinylidene fluoride resin, and tetrafluoroethylene-ethylene copolymer (ETFE). Besides, it is possible to use other materials which satisfy the above requirements.

Separately, the surface side covering member is not always necessary to be provided so as to cover the entire front surface of the filler layer 302 in which the photovoltaic element group 303 is enclosed as long as the foregoing performance for the solar cell module is ensured, where it is possible for the surface side covering member to be provided such that it covers a necessary area of the front surface of said filler layer.

Filler 302

The filler 103 necessarily comprises a material which excels in weatherability, adhesion, heat resistance, cold resistance, and shock resistance, and also in packing performance. Preferable specific examples of such a material are EVA (ethylene-vinyl acetate copolymer), EEA (ethylene-ethyl acrylate copolymer), polyolefin resins, urethane resins, silicone resins, and fluororesins.

Of these, EVA is the most appropriate because it exhibits well-balanced physical properties when used in a solar cell module.

Back Side Covering Member 304

The back side covering member 304 desirably comprises a member which excels particularly in insulating characteristic and durability. Preferable specific examples of such a member are resin films excelling in insulating characteristic and durability such as nylon film, TEDLAR [trademark name, comprising PVF (polyvinyl fluoride)] film, and PET (polyethylene terephthalate) film.

Back Face Reinforcing Member 305

The back face reinforcing member 305 is required to excel particularly in weatherability, rigidity, and flexibility. Thus, the back face reinforcing member 305 necessarily comprises a member which satisfies these requirements. Such a member can include stainless steel sheets, plated steel sheets, galvanized steel sheets, and the like.

In the case where the back face reinforcing member 305 is provided, the back side covering member 304 is not always necessary to be provided.

Frame 306

The frame 306 is desired to comprise a long side member comprising aluminum applied with alumite treatment or a galvanized steel. The long side member may be structured in a hollow form or a ⊐-like form. These forms are selectively adopted depending upon the configuration of a solar cell module used.

Terminal Box 307

As shown in FIG. 3(*b*) or FIG. 3(*c*), the terminal boxes 307 having the connection cable 308 are provided in the solar cell module in order to output an electric power (a DC power) generated in the solar cell module.

The terminal box 307 is required to excel in heat resistance, moisture resistance, waterproofness, electrical insulating properties, cold resistance, resistance to oil, weatherability, and mechanical strength. The terminal box is desirably constituted by a material which satisfies these requirements and which has good adhesion with an adhesive.

As such a material, fire-resistant plastics are particularly preferable. Such a plastic can include engineering plastics which excel in physical strength, shock resistance, heat resistance, hardness, and aging resistance. Specific examples are polycarbonate, polyamide, polyacetal, modified PPO (denaturalization polyphenylene oxide), polyester, polyarylate, unsaturated polyester, phenol resin, and epoxy resin.

Other than these, thermoplastics such as ABS resin (acrylonitrile butadiene styrene polymer), PP (polypropylene), and PV (polyvinyl chloride) are also suitable for use depending upon the situation involved. In addition, it is possible use carbon black as a pigment in order to improve the resistance to ultraviolet rays. Besides, it is possible that a resin coating material having a property to absorb ultraviolet ray is applied on the surface.

Connection Cable 308

There is no particular limitation for the connection cable 308 used in the present invention. However, as the connection cable, it is necessary to selectively use an appropriate cable having a desired cable structure and which has relevant heat resistance to the environment where the solar cell module is installed, specifically, which is good enough with respect to heat resistance, cold resistance, resistance to oil, weatherability, and fire-resistance.

Preferable specific examples of such a cable are insulating cables such as IV cable, KIV cable, HKIV cable, crosslinked polyethylene cable, fluororubber cable, silicone rubber cable, and fluororesin cable. Besides, VV cable, CV cable, CE cable, EE cable and cabtyre cable are also suitable for use.

These cables as the connection cable 308 may be used also as the foregoing inter module connection cable and also as the foregoing string cable.

Solar Cell Module String (107, 108, 109, 110)

As previously described, an assembled circuit comprising a plurality of solar cell modules (103) electrically serialized with each other in order to provide a solar cell module array which satisfies a desired output voltage is termed "solar cell module string" in the present invention. The voltages of the solar cell module strings 107–110 are set so that the sum of the voltages falls within an input voltage range of the inverter.

Solar Cell Module Array

As previously described, a configuration in which a plurality of solar cell module strings (107, 108, 109, 110) are electrically connected with each other in parallel connection in order to obtain a desired output power is termed a "solar cell module array". The term "solar cell module string" will be hereinafter referred to as "string" for simplification purposes.

In general, the string cables 104 from the strings 107–110 are taken into the inside of the building through the entrapment holes (105*a*, 105*b*; or 105*c*, 105*d*), they are electrically connected to a junction box provided in the inside of the building where they are subjected to parallel operation, followed by being electrically connected to an inverter where the DC power inputted therein is converted into an AC power.

String Cable 104

As previously described, each of the cables used to electrically connect the positive and negative terminals of each of the strings 107–110 to the junction box in order to electrically connect the strings 107–110 in parallel connection is termed "string cable" in the present invention. As the string cable, the cables previously mentioned as the examples of the connection cable 308 may be selectively used.

The string cables 104 are drawn in the inside of the building by passing them through the entrapment holes (105*a*, 105*b*; or 105*c*, 105*d*) as above-described.

Entrapment Hole (105a, 105b, 105c, 105d)

In the present invention, the hole through which the string cables of the solar cell module array established on the installation face 101 are drawn to electrically connect to the junction box provided in the inside of the building is termed an "entrapment hole".

In the case where the installation face is a roof face of a building, the entrapment hole (105a, 105b, 105c, 105d) may be provided at a desired position of a sheathing board of the roof. Alternatively, it may be provided at a desired position of an edge of the eaves of the roof, a verge of the roof, or a ridge of the roof.

Installation Face 101

As previously described, the installation face is meant a face on which the solar cell module is installed. The installation face mainly indicates a roof face of a building. But this is not limitative.

In the following, the features and advantages of the present invention will be described in more detail by reference to the following examples, which are provided merely for illustrative purposes and are not intended to limit the scope of the present invention.

EXAMPLE 1

In this example, as the installation face, there was used a roof face in a normal trapezoidal form of a building as shown in FIG. 1(*a*), having a base (an eaves) with a length of 12000 mm, an upper hem (a ridge) with a length of 3640 mm, and a length in a roof flow direction (hereinafter referred to as "roof flow direction length") of 4957 mm. An installable area (range) in a normal trapezoidal form of the roof face is such that an interval of 500 mm is present between the base of the installable area and that of the roof face and also between the upper hem of the installable area and that of the roof face, and an interval of 300 mm is present between each of the verges of the installable area and that of the roof face.

In accordance with the arrangement manner previously described with reference to FIG. 1(*a*), a plurality of roofing material-integral type solar cell modules of the configuration shown in FIGS. 3(*c*) and 3(*d*) and having a lateral length [in a horizontal direction in FIG. 1(*a*)] of 822 mm and a vertical length [in a vertical direction in FIG. 1(*a*)] of 1220 mm were arranged on the trapezoidal installable area of the roof face so that the solar cell modules arranged in one arrangement row and those arranged in the other arrangement row were completed in terms of their edge lines in a direction perpendicular to a horizontal line.

In FIG. 1(*a*), reference numeral 101 indicates the above-described roof face, reference numeral 102 the above-described installable area, reference numeral 103 the above-described solar cell module, reference numeral 104 a string cable, each of reference numerals 105a to 105c an entrapment hole, and reference numeral 106 an incombustible member (an incombustible partition plate). Reference numeral 107 indicates a first solar cell module string, reference numeral 108 a second solar cell module string, reference numeral 109 a third solar cell module string, and reference numeral 110 a fourth solar cell module string. (The term "solar cell module string" will be hereinafter referred to as "string" for simplification purposes.)

In the following, description will be made of the arrangement and wiring procedures.

Computation of a Maximum Installable Arrangement Row Number

When the length of the installable area 102 in a roof flow direction (that is, the vertical length of the installable area) is made to be A.

A=3957 mm.

The arrangement row number is:

the arrangement row number≦3957/1220=3.24.

Thus, the maximum installable arrangement row number is computed to be 3 rows.

Computation of a Maximum Installable Number of Solar Cell Modules in Each Arrangement Row As an example, computation will be made of the first, second, and third rows from the base of the installable area 102.

The maximum installable number of solar cell modules (hereinafter referred to as "maximum solar cell module installable number") in each arrangement row can be computed as follows.

The maximum solar cell module installable number in each arrangement row can be computed in accordance with the following equation. Here, the upper hem length of each arrangement row of the installable area 102 in which the solar cell modules are arranged is expressed by the term "row's upper hem length" for simplification purposes. The maximum solar cell module installable number is expressed by the term "maximum installable number" for simplification purposes.

$$\text{The maximum installable number} \leq \text{the row's upper hem length}/ \text{the length of one solar cell module} \qquad (I)$$

The row's upper hem length of the first arrangement row is 8499 mm, that of the second arrangement row is 6442 mm, and that of the third arrangement row is 4384 mm. The lateral length of each solar cell module is 822 mm.

By substituting these figures in the above equation (I), the following are computed.

The maximum installable number in the first arrangement row is:

≦8499/822=10.33.

The maximum installable number in the second arrangement row is:

≦6442/822=7.83.

The maximum installable number in the third arrangement row is:

≦4384/822=5.33.

Thus, there are computed that the maximum installable number of the solar cell modules in the first arrangement row is 10, that in the second arrangement row is 7, and that in the third arrangement row is 5.

Arrangement of the solar cell modules on the installable area 102 of the roof face 101

While taking the maximum installable numbers in the first to third arrangement rows computed in the above into consideration, the corresponding number of solar cell modules were arranged on the installable area 102 in three rows (the first to third arrangement rows) as shown in FIG. 1(*a*). Particularly, as shown in FIG. 1(*a*), 10 of the solar cell modules were arranged in the first arrangement row (this arranged number is the same as the maximum installable number in the first arrangement row computed in the above), 6 of the solar cell modules were arranged in the second arrangement row (this arranged number is smaller by 1 than the maximum installable number in the second arrangement row computed in the above), and 4 of the solar cell modules were arranged in the third arrangement row (this arranged number is smaller by 1 than the maximum installable number in the third arrangement row computed in the above).

In the area where no solar cell module is present, ordinary roofing materials were provided.

Determination of series number and parallel number

In this embodiment, there was used an inverter whose input power range is 130 V to 320 V.

The number of solar cell modules capable of being serialized per one string (this number will be hereinafter referred to as "module series number") can be computed in accordance with the following equations.

$$130/(\text{minimum Vpm of one solar cell module}) \leq \text{the module series number} \quad \text{(II)}$$

$$320/(\text{maximum Voc of one solar cell module}) \leq \text{the module series number} \quad \text{(III)}$$

Each of the solar cell modules used in this embodiment has a minimum Vpm of 26.2 V and a maximum Voc of 33.0 V.

By substituting these values in the above equations (II) and (III), there is computed that the module series number is 5 to 9. Thus, it is possible that 5 to 9 of the solar cell modules are electrically serialized per one string (one solar cell module string).

Consequently, it is understood that 20 of the solar cell modules can be arranged on the installable area 102 of the roof face 101. That is, by making the solar cell modules involved such that five of them are serialized per one string and five strings are electrically connected in parallel connection, the 20 solar cell modules can be installed on the roof face.

Wiring

In this embodiment, as shown in FIG. 1(a), a first string 107 (a first solar cell module string), a second string 108 (a second solar cell module string), a third string 109 (a third solar cell module string) and a fourth string 110 (a fourth solar cell module string) respectively comprising the five solar cell modules electrically serialized were formed. In accordance with the wiring manner previously described with reference to FIG. 1(a), the string cables 104 extending from these strings were drawn into the inside of the building by passing them respectively through the two entrapment holes 105a and 105b provided on the left and right sides of the roof face and the entrapment hole 105c provided on the ridge side of the roof face, and the string cables 104 thus drawn into the inside of the building were electrically connected to a junction box provided there, which is electrically connected to the foregoing inverter provided also in the inside of the building. In this wiring, the positive string cables and the negative string cables were wired so that the former and the latter were not crossed or contacted with each other as shown in FIG. 1(a).

In the above entrapment hole 105c provided on the ridge side of the roof face 101, an incombustible partition plate 106 comprising an incombustible member such as a gypsum board or a steel plate coated by an incombustible material was inserted to form a left side space and a right side space divided by the partition plate 106.

Particularly, in the above wiring of the string cables 104, the positive string cables 104 extending from the first string 107 and the fourth string 110 were passed through the entrapment hole 105a on the left side in the figure, and the negative string cables 104 extending from the second string 108 and the third string 109 were passed through the entrapment hole 105b provided on the right side in the figure. The negative string cables 104 extending from the first string 107 and the fourth string 110 were drawn into the inside of the building by passing them through the left side space of the entrapment hole 105c, and the positive string cables 104 extending from the second string 108 and the third string 109 were passed through the entrapment hole 105b situated on the right side in the figure. By this, the positive and negative string cables 104 in the entrapment hole 105c can be prevented from being contacted with each other.

EXAMPLE 2

The procedures of Example 1 were repeated, except that the arrangement manner of the string cables was changed, and the number of entrapment holes to be used and their positions were changed as shown in FIG. 1(b).

Specifically, in this embodiment, two entrapment holes 105d and 105e were provided on the ridge side of the roof face 101. The positive string cables were drawn into the inside of the building by passing them through the entrapment hole 105d provided on the left side in the figure and the negative string cables were drawn into the inside of the building by passing them through the entrapment hole 105e provided on the right side in the figure.

In the case where the string cables are wired as shown in FIG. 1(b), there is a fear that the positive string cables and the negative string cables would contact one another on the ridge side of the roof face.

In order to prevent the occurrence of this situation, in this embodiment, as shown in FIG. 5, a bridge member 501 comprising an incombustible material (a steel sheet coated by an incombustible insulating material was provided at a portion where the different string cables having a different polarity would contact one another. By this, it is possible to prevent these string cables from being contacted with each other.

Specifically, as the above bridge member 501, there was used an already fabricated roofing material comprising a precoated stainless steel sheet (which is used in the formation of a painted roof). Thus, this situation is advantageous from an economical viewpoint. There is another advantage such that the roofing material can be readily inserted as a partition member.

EXAMPLE 3

In this example, as the installation face, there was used a gable roof face 1101 of a building as shown in FIG. 10, having a base (an eaves) with a length of 10000 mm, an upper hem (a ridge) with a length of 10000 mm, and a length in a roof flow direction (hereinafter referred to as "roof flow direction length") of 4500 mm. An installable area 1002 (an installable range) of the roof face is such that substantially no interval is present between the base of the roof face and that of the installable area, an interval of 200 mm is present between the upper hem of the roof face and that of the installable area, and an interval of 100 mm is present between each of the verges of the roof face and the boundary of each of opposite sides of the installable area.

A plurality of solar cell modules (each comprising 8 photovoltaic elements electrically serialized with each other) each having a pair of a positive terminal box and a negative terminal box respectively provided at one of the end portions of the back face and having a working width of 200 mm and a length of 2000 mm were arranged on the installable area 1002 of the roof face 1001 by an every other shift-roofing method as shown in FIG. 10.

In FIG. 10, reference numeral 1001 indicates the foregoing roof face (corresponding to an installation face), reference numeral 1002 the foregoing installable area, reference numeral 1003 a solar cell module, reference numeral 1004 a positive string cable, reference numeral 1005 a negative string cable, reference numeral 1006 an entrapment hole, and reference numeral 1007 a partition plate comprising an incombustible insulating material. Reference numeral 1008 indicates a 1st string (a 1st solar cell module string), reference numeral 1009 a 2nd string (a 2nd solar cell module string), reference numeral 1010 a 3rd string (a 3rd solar cell module string), reference numeral 1011 a 4th string (a 4th solar cell module string), reference numeral 1012 a 5th string (a 5th solar cell module string), reference numeral 1013 a 6th string (a 6th solar cell module string), and reference numeral 1014 a 7th string (a 7th solar cell module string).

In the following, description will be made of the arrangement and wiring procedures.

As will be understood from FIG. 10, in the arrangement of the solar cell modules 1003 arranged on the installable area 1002, part of them are arranged such that their positive terminals are situated on the left side (these solar cell modules will be hereinafter referred to as "left positive terminal type solar cell module"), and the remaining part are arranged such that their positive terminals are situated on the right side (these solar cell modules will be hereinafter referred to as "right positive terminal type solar cell module").

Computation of a maximum installable arrangement row number.

When the length of the installable area 1002 in the roof flow direction is made to be A.

$$A = 4500 - 200 = 4300 \text{ mm.}$$

The arrangement row number is a maximum integer obtained by the following equation.

The arrangement row number $\leq$ A/the working width of one solar cell module  (IV)

By substituting the A value (4300) and the value of the working width (200) in the above equation (IV), there is obtained: the arrangement row number $\leq 4300/200 = 21.5$.

Thus, the maximum installable arrangement row number is computed to be 21 rows.

Computation of a maximum installable number of solar cell modules in each arrangement row.

When the length of the installable area in a horizontal direction is made to be B, the maximum installable number of solar cell modules in each arrangement row (hereinafter referred to as "maximum solar cell module installable number" for the simplification purpose) is a maximum integer obtained by the following equation.

The maximum solar cell module installable number $\leq$ B/the length of one solar cell module  (V)

Here, B=10000−(100×2)=9800 mm. The length of one solar cell module is 2000 mm.

By substituting these values in the above equation (V), there is obtained: the maximum solar cell module installable number 9800/2000=4.9.

Thus, the maximum installable number of solar cell modules in each arrangement row is computed to be 4 (solar cell modules).

Arrangement of the solar cell modules on the installable area 1002 of the roof face 1001.

In each arrangement row of the installable area 1002, a solar cell module group comprising the solar cell modules in the number corresponding to the maximum solar cell module installable number computed in the above was arranged.

Every Other Shift-roofing

In the above arrangement of the solar cell modules, the shift difference width between the solar cell module group in one arrangement row and that in the other arrangement row situated next to said arrangement row was made to be 200 mm. Particularly, the solar cell module groups in the respective arrangement rows were positioned such that their arrangement positions were alternately shifted by 100 mm on either side.

Determination of series number and parallel number.

In this embodiment, there was used an inverter whose input power range is 100 V to 350 V.

The number of solar cell modules capable of being serialized per one string (this number will be hereinafter referred to as "module series number") can be computed in accordance with the following equations.

100/(minimum Vpm of one solar cell module) $\leq$ the module series number  (VI)

350/(maximum Voc of one solar cell module) $\geq$ the module series number  (VII)

Each of the solar cell modules 1003 used in this embodiment has a minimum Vpm of 1.28 V and a maximum Voc of 2.12 V.

By substituting these values in the above equations (VI) and (VII), there is computed that the module series number is 79 to 165. Thus, it is possible that 10 to 20 of the solar cell modules 1003 are electrically serialized per one string (one solar cell module string).

Consequently, it is understood that the solar cell modules in the number of 4×21=84 can be arranged on the installable area 1002 of the roof face 1001. That is, by making the solar cell modules involved such that that 12 of them are serialized per one string and 7 strings (see, 1008–1014 in FIG. 10) are electrically connected in parallel connection, all the solar cell modules considered capable of being installed can be installed on the roof face.

Wiring

In this embodiment, the strings involved were arranged as follows. That is, the arrangement of one of every two other solar cell module groups comprising 4 of the solar cell modules in the respective arrangement rows is shifted by 100 mm toward the left verge side so that the negative terminal of one left-sided solar cell module of the solar cell module group involved is exposed on the left verge side and the arrangement of each of the remaining solar cell module groups is shifted by 100 mm toward the right verge side so that the negative terminal of one right-sided solar cell module of the solar cell module group involved is exposed on the right verge side as shown in FIG. 10. As shown in FIG. 10, a 1st string 1008 is formed by electrically serializing the 12 solar cell modules situated in the 1st to 3rd arrangement rows, a 2nd string 1009 is formed by electrically serializing the 12 solar cell modules situated in the 4th to 7th arrangement rows, a 3rd string 1010 is formed by electrically serializing the 12 solar cell modules situated in the 8th to 10th arrangement rows, a 4th string 1011 is formed by electrically serializing the 12 solar cell modules situated in the 11th to 13th arrangement rows, a 5th string 1012 is formed by electrically serializing the 12 solar cell modules situated in the 15th to 17th arrangement rows, a 6th string 1013 is formed by electrically serializing the 12 solar cell modules situated in the 18th to 21st arrangement rows, and a 7th string 1014 is formed by electrically serializing the 12 solar cell modules situated in the 22nd to 24th arrangement rows.

In this way, it is possible to make it such that all the negative string cables 1004 are arranged on the left side of the roof face and all the positive string cables 1005 are arranged on the right side of the roof face. Hence, it is possible that the negative string cables 1004 and the positive string cables 1005 are separately wired until the entrapment hole 1006 without being mutually crossed or contacted. In addition, the negative string cables 1004 and the positive string cables 1005 can be separately and readily arranged in areas other than the area where the solar cell modules are arranged, and because of this, it is also possible to prevent the string cables from contacting the inter module connection cables.

The negative string cables 1004 and the positive string cables 1005 were drawn into the inside of the building by passing them through the entrapment hole 1006, and the string cables thus drawn into the inside of the building were electrically connected to a junction box provided there, which is electrically connected to the foregoing inverter provided also in the inside of the building.

Now, the entrapment hole 1006 was provided on the ridge side of the roof face 1001 as shown in FIG. 10, and in the entrapment hole 1006, an incombustible partition plate 107 comprising an incombustible member such as a gypsum board or a steel plate coated by an incombustible insulating material was inserted to form a left side space and a right side space divided by the partition plate 1007.

Particularly, in the above wiring of the string cables, the negative string cables 1004 and the positive string cables 1005 were separately drawn into the inside of the building by passing the former through one of the left side and right side spaces of the entrapment hole 1006 and passing the latter through the remaining space of the entrapment hole.

By this, the negative string cables 1004 and the positive string cables 1005 in the entrapment hole 1006 can be prevented from contacting one another.

EXAMPLE 4

In this example, as the installation face, there was used a hipped-roof face 1101 of a building as shown in FIG. 11(*a*), having a base (an eaves) with a length of 12000 mm, an upper hem (a ridge) with a length of 5000 mm, and a length in a roof flow direction (hereinafter referred to as "roof flow direction length") of 4500 mm. An installable area 1102 (an installable range) of the roof face 1101 is such that substantially no interval is present between the base of the roof face and that of the installable area, an interval of 200 mm is present between the upper hem of the roof face and that of the installable area, and an interval of 200 mm is present between each of the verges of the roof face and the boundary of each of the opposite sides of the installable area.

A plurality of solar cell modules (each comprising 8 photovoltaic elements electrically serialized with each other) each having a pair of a positive terminal box and a negative terminal box respectively provided at one of the end portions of the back face and having a working width of 200 mm and a length of 2000 mm were arranged on the installable area 1102 of the roof face 1101 by an every other shift-roofing method as shown in FIG. 11(*a*).

In FIG. 11(*a*), reference numeral 1101 indicates the foregoing roof face (corresponding to an installation face), reference numeral 1102 the foregoing installable area, reference numeral 1103 a solar cell module, reference numeral 1105 an entrapment hole, reference numeral 1106 an incombustible insulating material (or a partition plate), and reference numeral 1107 a string cable. Reference numeral 1104 indicates a 1st string (a 1st solar cell module string), reference numeral 1108 a 2nd string (a 2nd solar cell module string), reference numeral 1109 a 3rd string (a 3rd solar cell module string), and reference numeral 1110 a 4th string (a 4th solar cell module string). Reference numeral 103' indicates a solar cell module which is the same as said solar cell module 1103. This reference numeral 103' is used for identifying each of given two solar cell modules situated next to each other in the explanation which will be described later.

In the following, description will be made of the arrangement and wiring procedures.

As will be understood from FIG. 11(*a*), in the arrangement of the solar cell modules 1103 arranged on the installable area 1102, part of them are arranged such that their positive terminals are situated on the left side (these solar cell modules will be hereinafter referred to as "left positive terminal type solar cell module"), and the remaining part are arranged such that their positive terminals are situated on the right side (these solar cell modules will be hereinafter referred to as "right positive terminal type solar cell module").

Computation of a maximum installable arrangement row number.

When the length of the installable area 1102 in the roof flow direction is made to be A.

$$A = 4500 - 200 = 4300 \text{ mm}.$$

The arrangement row number is a maximum integer obtained by the following equation.

$$\text{The arrangement row number is} \leq A/\text{the working width of one solar cell module} \qquad \text{(VIII)}$$

By substituting the A value (4300) and the value of the working width (200) in the above equation (VIII), there is obtained: the arrangement row number $\leq 4300/200 = 21.5$.

Thus, the maximum installable arrangement row number is computed to be 21 rows.

Computation of a maximum installable number of solar cell modules in each arrangement row.

When the length of the installable area in a horizontal direction is made to be B, the maximum installable number of solar cell modules in each arrangement row (hereinafter referred to as "maximum solar cell module installable number" for simplification purposes) is a maximum integer obtained by the following equation (IX).

$$\text{The maximum solar cell module installable number} \leq B/\text{the length of one solar cell module} \qquad \text{(IX)}$$

Here, B is a value obtained by subtracting a shifted width of a solar cell module group in each arrangement row from the length of the installable area of said arrangement row. In this embodiment, said shifted width is made to be 200 mm. In this connection, there are computed such that the maximum solar cell module installable number in each of the 1st to 4th arrangement rows is 5 solar cell modules, that in each of the 5th to 10th arrangement rows is 4 solar cell modules, that in each of the 11th to 17th arrangement rows is 3 solar cell modules, and that in each of the 18th to 21th arrangement rows is 2 solar cell modules.

Arrangement of the solar cell modules on the installable area 1102 of the roof face 1101.

In each arrangement row of the installable area 1102, a solar cell module group comprising the solar cell modules in the number corresponding to the maximum solar cell module installable number computed in the above was arranged.

Every Other Shift-roofing

In the above arrangement of the solar cell modules, the shift difference width between the solar cell module group in one arrangement row and that in the other arrangement row situated next to said arrangement row was made to be 200 mm. Particularly, the solar cell groups in the respective arrangement rows were positioned such that their arrangement positions were alternately shifted by 100 mm on either side.

Determination of Series Number and Parallel Number

In this embodiment, there was used an inverter whose input power range is 100 V to 350 V.

The number of solar cell modules capable of being serialized per one string (this number will be hereinafter referred to as "module series number") can be computed in accordance with the following equations.

$$100/(\text{minimum Vpm of one solar cell module}) \leq \text{the module series number} \quad (X)$$

$$350/(\text{maximum Voc of one solar cell module}) \geq \text{the module series number} \quad (XI)$$

Each of the solar cell modules 1103 used in this embodiment has a minimum Vpm of 1.28 V and a maximum Voc of 2.12 V.

By substituting these values in the above equations (X) and (XI), there is computed that the module series number is 79 to 165. Thus, it is possible that the solar cell modules 1103 in the number of 10 to 20 are electrically serialized per one string (one solar cell module string).

Consequently, it is understood that the solar cell modules in the number of 73 can be arranged on the installable area 1102 of the roof face 1101. That is, by making the arrangement of the solar cell modules such that 18 of them are serialized per one string to form 4 strings [see, 1104, and 1108–110 in FIG. 11(*a*)] which are electrically connected in parallel connection, the solar cell modules in the number of 72, which is proximate to the above number 73, can be installed on the roof face. In this case, the four strings are a 1st string 1104, a 2nd string 1108, a 3rd string 1109, and a 4th string 1110, each comprising 18 of the solar cell modules electrically serialized through an inter module connection cable.

Solar Cell Module Arrangement

When beginning to arrange the 73 solar cell modules from the first arrangement row so as to satisfy the foregoing requirements with respect to the maximum solar cell installable numbers in the respective arrangement rows and to form the four strings, the arrangement of the 1st string 1104 is terminated enroute to the fourth arrangement row, where the 2nd string 1108 is started. Thus, the last solar cell module 1103 of the 1st string 1104 is unavoidably approximated to the beginning solar cell module 1103' (1103) of the 2nd string 1108, where the string cable 1107 extending from the terminal of solar cell module 1103 of the 1st string 1104 and that extending from the terminal of the solar cell module 1103' of the 2nd string 1108 are liable to contact one another. When the polarity of the former string cable is different from that of the latter string cable, there is a fear that electric short will occur between them.

In this embodiment, in order to prevent the occurrence of this situation, the two string cables situated next to each other were made to be of the same polarity by making the solar cell modules (including the solar cell module 1103 involved) of the 1st string 1104 situated in the fourth arrangement row to be of the left positive terminal type and making the solar cell modules (including the solar cell module 1103' involved) of the 2nd string 1108 situated in the fourth arrangement row to be of the right positive terminal type as shown in FIG. 11(*a*).

By this, it is possible that the occurrence of mutual contact between the two string cables having a different polarity is prevented and the occurrence of such an electrical short as above-described is prevented.

Entrapment Holes 105

In order for the string cables 1107 to be drawn into the inside of the building to connect to a junction box provided there, which is connected to the foregoing inverter which is also provided in the inside of the building, three entrapment holes 105 were provided as shown in FIG. 11(*a*). As shown in FIG. 11(*a*), the positive and negative string cables 1107 are passed through the entrapment hole 1105 provided at a position situated on the right side below the ridge portion. In this connection, in this entrapment hole 1105, an incombustible partition plate 1106 comprising an incombustible member such as a gypsum board or a steel plate coated by an incombustible insulating material was inserted to form a left side space and a right side space divided by the partition plate 1106. The negative string cables and the positive string cables were separately drawn into the inside of the building by passing the former through one of the left side and right side spaces of the entrapment hole 1105 and passing the latter through the remaining space of the entrapment hole.

By this, the negative string cables and the positive string cables in the entrapment hole 1105 can be prevented from contacting one another.

EXAMPLE 5

The procedures of Example 4 were repeated, except that the arrangement manner of the string cables was changed, and the number and positions of the entrapment holes to be used were changed as shown in FIG. 11(*b*).

Specifically, in this embodiment, one entrapment hole 1105 was provided at a central position of the ridge portion of the roof face 1101. In order to prevent the positive and negative string cables from being mutually contacted in the entrapment hole 1105, a partition means 1106 comprising an incombustible insulating sealing member was inserted to form a left side space and a right side space divided by the partition means 1106. The negative string cables and the positive string cables were separately drawn into the inside of the building by passing the former through one of the left side and right side spaces of the entrapment hole 1105 and passing the latter through the remaining space of the entrapment hole.

By using the incombustible insulating sealing member, the upper portion of the entrapment hole could be covered by the incombustible insulating sealing member.

This makes it possible to prevent external air from flowing to the back faces of the solar cell modules through the entrapment hole, whereby the fireproofness of the roof can be improved. In addition, the rain shed of the roof can be improved.

EXAMPLE 6

In this example, as the installation face, there was used a gable roof face 1201 of a building as shown in FIG. 12, having a base (an eaves) with a length of 10000 mm, an upper hem (a ridge) with a length of 10000 mm, and a length in a roof flow direction (hereinafter referred to as "roof flow direction length") of 4000 mm. An installable area 1202 (an installable range) of the roof face 1201 is such that substantially no interval is present between the base of the roof face and that of the installable area, an interval of 300 mm is present between the upper hem of the roof face and that of the installable area, and an interval of 100 mm is present between each of the verges of the roof face and the boundary of each of the opposite sides of the installable area.

A plurality of solar cell modules (each comprising 8 photovoltaic elements electrically serialized with each other) each having a pair of a positive terminal box and a negative terminal box respectively provided at one of the end portions of the back face and having a working width of 200 mm and a length of 2000 mm were arranged on the installable area 1202 of the roof face 1201 by an every other shift-roofing method as shown in FIG. 12.

In FIG. 12, reference numeral 1201 indicates the foregoing roof face (corresponding to an installation face), reference numeral 1202 the foregoing installable area, reference numeral 1203 a solar cell module, reference numeral 1204 a string cable, reference numeral 1205 an entrapment hole, reference numeral 1206 an incombustible insulating material as a partition means, and reference numeral 1207 a inter module connection cable. Reference numeral 1208 indicates a 1st string (a 1st solar cell module string), reference numeral 1209 a 2nd string (a 2nd solar cell module string), reference numeral 1210 a 3rd string (a 3rd solar cell module string), and reference numeral 1211 a 4th string (a 4th solar cell module string).

In the following, description will be made of the arrangement and wiring procedures.

As will be understood from FIG. 12, in the arrangement of the solar cell modules 1203 arranged on the installable area 1202, part of them are arranged such that their positive terminals are situated on the left side (these solar cell modules will be hereinafter referred to as "left positive terminal type solar cell module") and the remaining part are arranged such that their positive terminals are situated on the right side (these solar cell modules will be hereinafter referred to as "right positive terminal type solar cell module").

Computation of a Maximum Installable Arrangement Row Number

When the length of the installable area 1202 in the roof flow direction is made to be A.

$$A=4000-300=3700 \text{ mm.}$$

The arrangement row number is a maximum integer obtained by the following equation.

The arrangement row number $\leq$ A/the working width of one solar cell module (XII)

By substituting the A value (4300) and the value of the working width (200) in the above equation (IV), there is obtained: the arrangement row number $\leq$ 3700/200=18.5.

Thus, the maximum installable arrangement row number is computed to be 18 rows.

Computation of a maximum installable number of solar cell modules in each arrangement row.

When the length of the installable area in a horizontal direction is made to be B, the maximum installable number of solar cell modules in each arrangement row (hereinafter referred to as "maximum solar cell module installable number" for simplification purposes) is a maximum integer obtained by the following equation.

The maximum solar cell module installable number $\leq$ B/the length of one solar cell module (XIII)

Here, B=10000−(100×2)=9800 mm. The length of one solar cell module is 2000 mm.

By substituting these values in the above equation (XIII), there is obtained: the maximum solar cell module installable number 9800/2000=4.9.

Thus, the maximum installable number of solar cell modules in each arrangement row is computed to be 4 (solar cell modules).

Arrangement of the solar cell modules on the installable area 1202 of the roof face 1201.

In each arrangement row of the installable area 1202, a solar cell module group comprising the solar cell modules in the number corresponding to the maximum solar cell module installable number computed in the above was arranged.

Every Other Shift-roofing

In the above arrangement of the solar cell modules, the shift difference width between the solar cell module group in one arrangement row and that in the other arrangement row situated next to said arrangement row was made to be 200 mm. Particularly, the solar cell groups in the respective arrangement rows were positioned such that their arrangement positions were alternately shifted by 100 mm on either side.

Determination of Series Number and Parallel Number

In this embodiment, there was used an inverter whose input power range is 153.5 V to 330 V.

The number of solar cell modules capable of being serialized per one string (this number will be hereinafter referred to as "module series number") can be computed in accordance with the following equations.

$$153.5/(\text{minimum Vpm of one solar cell module}) \leq \text{the module series number} \quad \text{(XIV)}$$

$$330/(\text{maximum Voc of one solar cell module}) \geq \text{the module series number} \quad \text{(XV)}$$

Each of the solar cell modules 1203 used in this embodiment has a minimum Vpm of 1.28 V and a maximum Voc of 2.12 V.

By substituting these values in the above equations (XIV) and (XV), there is computed that the module series number is 120 to 155. Thus, it is possible that 15 to 19 of the solar cell modules 1003 are electrically serialized per one string (one solar cell module string).

Consequently, it is understood that the solar cell modules in the number of 4×18=72 can be arranged on the installable area 1202 of the roof face 1201. That is, by making the solar cell modules involved such that 18 of them are serialized per one string and 4 strings (see, 1208–1211 in FIG. 12) are electrically connected in parallel connection, all the solar cell modules (72 solar cell modules) considered capable of being installed can be installed on the roof face.

Wiring

In this embodiment, as shown in FIG. 12, the solar cell modules involved were installed on the installable area 1202 as follows. A solar cell group comprising 4 of the solar cell modules is positioned in each of the 18 arrangement rows and the 18 solar cell module groups are alternately shifted by 100 mm on either side, where these solar cell module groups are alternately differed such that the positive or negative terminals of the solar cell modules arranged in every other solar cell module group are faced toward an either side. Of the solar cell modules of these solar cell module groups, every 18 solar cell modules are electrically serialized by means of an inter module connection cable 1207 to form four strings, i.e., a first string 1208, a second string 1209, a third string 1210, and a fourth string 1211. Each of these strings has a pair of string cables 1204 (a positive string cable and a negative string cable).

In this embodiment, there were provided two entrapment holes 1205 in an area in the vicinity of the ridge of the roof face such that one was situated on the left side and the other was situated on the right side. The positive and negative string cables 1204 extending from the first and third strings 1208 and 1210 were drawn into the inside of the building by passing them through the entrapment hole 1205 on the left side and the positive and negative string cables 1204 extending from the second and fourth strings 1209 and 1211 were also drawn into the inside of the building bypassing them through the entrapment hole 1205 on the right side, where these string cables thus drawn into the inside of the building are electrically connected to a junction box provided there, which is electrically connected to the foregoing inverter also provided there.

In the above, as shown in FIG. 12, the positive and negative string cables extending from the respective strings were separately wired in an area with no solar cell module and between the positive and negative terminal boxes of each of the solar cell modules involved. By this, it is possible not only to prevent the positive and negative string cables from being mutually contacted but also to prevent the string cables from contacting the inter module connection cables.

In the above, in order to prevent mutual contact between the positive and negative string cables 1204 in each of the entrapment holes 1205, in each of the entrapment holes, an incombustible partition means 1206 comprising a gypsum board was inserted to form a left side space and a right side space divided by the partition means 1206. The positive and negative string cables 1204 involved were separately drawn into the inside of the building by passing one through one of the left side and right side spaces of the entrapment hole and passing the other through the remaining space of the entrapment hole. By this, the positive and negative string cables 1204 in each of the entrapment holes 1205 can be prevented from contacting one another.

Separately, for the gypsum board used as the incombustible partition means 1206, it can be readily processed into a desired form usable as the partition means 1206 by means of an appropriate cutter. The partition means comprising such a gypsum board member can be readily fixed to a roof bed by means of screwing or nailing or by way of bonding with the use of an adhesive. Thus, the provision of the partition means can be readily and efficiently conducted at a reasonable cost.

EXAMPLE 7

Figure 13:
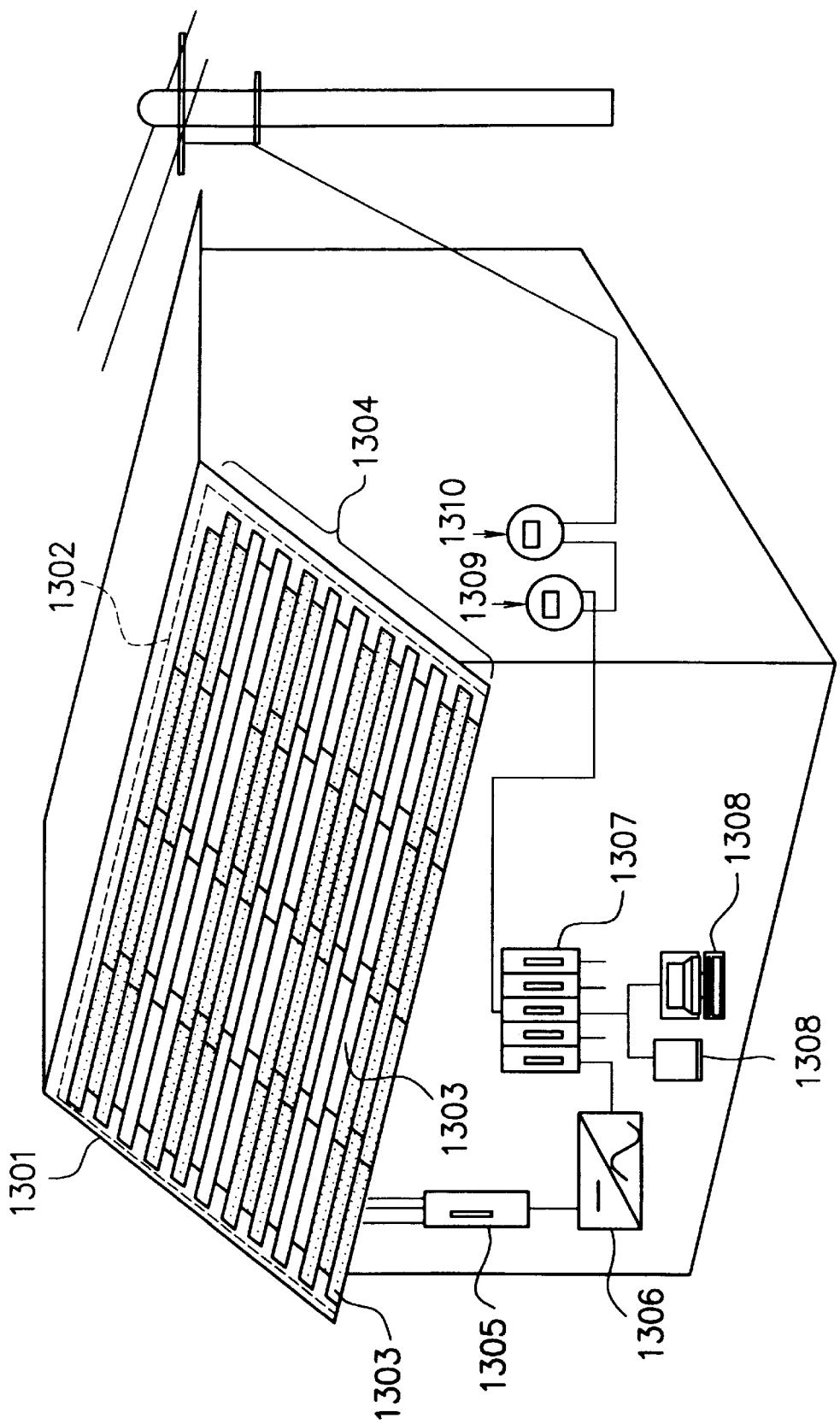
FIG. 13 is a schematic view illustrating an example of a sunlight power generation system according to the present invention.

In this example, a solar cell module array was assembled in accordance with the module-arranging method described in Example 4 to construct a system interconnection type sunlight power generation system with a reverse current flow for a residence as shown in FIG. 13.

In FIG. 13, reference numeral 1301 indicates a roof face (an installation face), reference 1302 an installable area, reference numeral 1303 a string (a solar cell module string), reference numeral 1304 a solar cell module array, reference numeral 1305 a junction box, and reference numeral 1306 an inverter. Reference numeral 1307 indicates a distribution panelboard, reference numeral 1308 a load, reference numeral 1309 a watt/hour meter for a dump power, and reference numeral 1310 a watt/hour meter for a power on demand.

As will be understood from the above description, according to the present invention, there can be readily structured a desirable solar cell module array on an installation face such as a roof face of a building so as to excel in safety, wherein the positive and negative string cables are wired in a desirable state so that no electric short occurs between these two cables. Particularly, even when a fire should occur in the vicinity of a building having said solar cell module array structure provided on its roof face, the solar cell module array structure is desirably prevented from suffering electric short among the cables wired therein.

What is claimed is:

1. An installation structure of a solar cell module array in which a plurality of solar cell module strings are arranged on an installation face, said plurality of solar cell module strings having a plurality of solar cell modules, an inter solar cell module connection cable to electrically connect said plurality of solar cell modules, a positive string cable and a negative string cable, characterized in that a non-contacting means comprising an incombustible material is provided such that no contact occurs between said positive string cable and said negative string cable or between said inter solar cell module connection cable and said positive string cable or/and said negative string cable.

2. The installation structure according to claim 1, wherein said non-contacting means comprises an incombustible tube which is provided as at least a part of at least one of said positive string cable, said negative string cable, and said inter solar cell module connection cable.

3. The installation structure according to claim 1, wherein said non-contacting means comprises an incombustible tube which is provided between two cables selected from said positive string cable, said negative string cable, and said inter solar cell module connection cable.

4. The installation structure according to claim 1, wherein said non-contacting means comprises an incombustible partition member in an entrapment hole into which said positive string cable and said negative string cable are taken in.

5. The installation structure according to claim 1, wherein said installation face is a roof face.

6. The the installation structure according to claim 1, wherein each of said plurality of solar cell modules is a building material-integral solar cell module.

7. The installation structure according to claim 6, wherein said building material-integral solar cell module is a roofing material-integral solar cell module.

8. An installation method for installing a solar cell module array comprising arranging a plurality of solar cell module strings on an installation face, said plurality of solar cell module strings having a plurality of solar cell modules, an inter solar cell module connection cable to electrically connect said plurality of solar cell modules, a positive string cable and a negative string cable, characterized in that a non-contacting means comprising an incombustible material is provided such that no contact occurs between said positive string cable and said negative string cable or between said inter solar cell module connection cable and said positive string cable or/and said negative string cable.

9. The installation method according to claim 8, wherein as said non-contacting means, an incombustible tube is provided as at least a part of at least one of said positive string cable, said negative string cable, and said inter solar cell module connection cable.

10. The installation method according to claim 8, wherein as said non-contacting means, an incombustible tube is provided between two cables selected from said positive string cable, said negative string cable, and said inter solar cell module connection cable.

11. The installation method according to claim 8, wherein as said non-contacting means, an incombustible partition member is provided in an entrapment hole into which said positive string cable and said negative string cable are taken in.

12. The installation method according to claim 8, wherein said installation face is a roof face.

13. The installation method according to claim 8, wherein each of said plurality of solar cell modules is a building material-integral solar cell module.

14. The installation method according to claim 13, wherein said building material-integral solar cell module is a roofing material-integral solar cell module.

15. An installation structure of a solar cell module array in which a plurality of solar cell module strings are arranged on an installation face, said plurality of solar cell module strings having a plurality of solar cell modules having a pair of a positive terminal box and a negative terminal box, an inter solar cell module connection cable to electrically connect said plurality of solar cell modules, a positive string cable and a negative string cable, characterized in that said plurality of solar cell modules and each of said inter solar cell module connection cable, said positive string cable and said negative string cable are arranged such that no contact occurs between said positive string cable and said negative string cable or between said inter solar cell module connection cable and said positive string cable or/and said negative string cable, wherein (a) at least part of said positive string cable or said negative string cable is arranged at a boundary portion of adjacent solar cell modules so that one string cable is not in contact with the other string cable or (b) at least part of said positive string cable or said negative string cable is arranged to traverse a region between the positive terminal box and the negative terminal box of each solar cell module so that the string cable in not in contact with connection cables extending from the two terminal boxes.

16. The installation structure according to claim 15, wherein each of said plurality of solar cell module strings has a positive terminal situated on one end side of said installation face and a negative terminal situated on the other end side of said installation face and said plurality of solar cell module strings are arranged such that their polarities on either side of said installation face are the same.

17. The installation structure according to claim 15, wherein said positive string cable or/and said negative string cable are arranged in an area of said installation face where no solar cell module is present.

18. The installation structure according to claim 15, wherein each of said plurality of solar cell modules has a positive terminal box and a negative terminal box, and said positive string cable or/and said negative string cable are arranged between the positive terminal boxes and the negative terminal boxes of said plurality of solar cell modules.

19. The installation structure according to claim 15, wherein said positive string cable or/and said negative string cable are arranged at boundary portions among said plurality of solar cell modules.

20. The installation structure according to claim 15, wherein when two adjacent solar cell module strings of said plurality of solar cell module strings are situated such that (a) a terminal of (a-i) one end portion of one of said two solar cell module strings where one of said positive string cable and said negative string cable is extending from said terminal is in close proximity to (b) a terminal of (b-i) one end portion of the other solar cell module string where the other string cable is extending from said terminal, solar cell modules arranged in said one end portion (a-i) and solar cell modules arranged in said one end portion (b-i) are arranged so that said terminal (a) and said terminal (b) are of the same polarity.

21. The installation structure according to claim 15, wherein said installation face is a roof face.

22. The installation structure according to claim 15, wherein each of said plurality of solar cell modules is a building material-integral solar cell module.

23. The installation structure according to claim 22, wherein said building material-integral solar cell module is a roofing material-integral solar cell module.

24. An installation method for installing a solar cell module array comprising arranging a plurality of solar cell module strings on an installation face, said plurality of solar cell module strings having a plurality of solar cell modules having a pair of a positive terminal box and a negative terminal box, an inter solar cell module connection cable to electrically connect said plurality of solar cell modules, a positive string cable and a negative string cable, characterized in that said plurality of solar cell modules and each of said inter solar cell module connection cable, said positive string cable and said negative string cable are arranged such that no contact occurs between said positive string cable and said negative string cable or between said inter solar cell module connection cable and said positive string cable or/and said negative string cable, wherein (a) at least part of said positive string cable or said negative string cable is arranged at a boundary portion of adjacent solar cell modules so that one string cable is not in contact with the other string cable or (b) at least part of said positive string cable or said negative string cable is arranged to traverse a region between the positive terminal box and the negative terminal box of each solar cell module so that the string cable in not in contact with connection cables extending from the two terminal boxes.

25. The installation method according to claim 24, wherein said plurality of solar cell module strings are arranged such that their positive terminals are situated on one end side of said installation face and their negative terminals are situated on the other end side of said installation face and said plurality of solar cell module strings are arranged such that their polarities on either side of said installation face are the same.

26. The installation method according to claim 24, wherein said positive string cable or/and said negative string cable are arranged in an area of said installation face where no solar cell module is present.

27. The installation method according to claim 24, wherein each of said plurality of solar cell modules has a positive terminal box and a negative terminal box, and said positive string cable or/and said negative string cable are arranged between the positive terminal boxes and the negative terminal boxes of said plurality of solar cell modules.

28. The installation method according to claim 24, wherein said positive string cable or/and said negative string cable are arranged at boundary portions among said plurality of solar cell modules.

29. The installation method according to claim 24, wherein when two adjacent solar cell module strings of said plurality of solar cell module strings are situated such that (a) a terminal of (a-i) one end portion of one of said two solar cell module strings where one of said positive string cable and said negative string cable is extending from said terminal is in close proximity to (b) a terminal of (b-i) one end portion of the other solar cell module string where the other string cable is extending from said terminal, solar cell modules arranged in said one end portion (a-i) and solar cell modules arranged in said one end portion (b-i) are arranged so that said terminal (a) and said terminal (b) are of the same polarity.

30. The installation method according to claim 24, wherein said installation face is a roof face.

31. The installation method according to claim 24, wherein each of said plurality of solar cell modules is a building material-integral solar cell module.

32. The installation method according to claim 31, wherein said building material-integral solar cell module is a roofing material-integral solar cell module.

33. A sunlight power generation system comprising said solar cell module array installation structure defined in any of claims 1 to 7 or in any of claims 15 to 23 and an inverter.

* * * * *

UNITED STATES PATENT AND TRADEMARK OFFICE
CERTIFICATE OF CORRECTION

PATENT NO. : 6,331,671 B1
DATED : December 18, 2001
INVENTOR(S) : Hidehisa Makita et al.

It is certified that error appears in the above-identified patent and that said Letters Patent is hereby corrected as shown below:

Column 4,
Line 7, "anon-contacting" should read -- a non-contacting --.

Column 12,
Line 10, "use" should read -- to use --.

Column 25,
Line 4, "an" should be deleted.

Column 27,
Line 42, "in" (first occurrence) should read -- is --.

Signed and Sealed this

Thirtieth Day of July, 2002

*Attest:*

JAMES E. ROGAN
*Attesting Officer*     *Director of the United States Patent and Trademark Office*